(12) United States Patent
Huang et al.

(10) Patent No.: US 12,356,259 B2
(45) Date of Patent: Jul. 8, 2025

(54) COMMUNICATION METHOD AND TERMINAL DEVICE

(71) Applicant: HUAWEI TECHNOLOGIES CO., LTD., Guangdong (CN)

(72) Inventors: Bin Huang, Shanghai (CN); Hai Lian, Shenzhen (CN); Li Shen, Shenzhen (CN); Bao Zhang, Shanghai (CN); Fengguang Qiu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 659 days.

(21) Appl. No.: 17/629,629

(22) PCT Filed: Jul. 20, 2020

(86) PCT No.: PCT/CN2020/103076
§ 371 (c)(1),
(2) Date: Jan. 24, 2022

(87) PCT Pub. No.: WO2021/013130
PCT Pub. Date: Jan. 28, 2021

(65) Prior Publication Data
US 2022/0248278 A1 Aug. 4, 2022

(30) Foreign Application Priority Data

Jul. 25, 2019 (CN) .......................... 201910678751.1
Sep. 19, 2019 (CN) .......................... 201910888868.2

(51) Int. Cl.
*H04W 36/00* (2009.01)
*H04W 8/18* (2009.01)

(52) U.S. Cl.
CPC ....... *H04W 36/0061* (2013.01); *H04W 8/183* (2013.01); *H04W 36/00222* (2023.05); *H04W 36/0058* (2018.08); *H04W 36/00838* (2023.05)

(58) Field of Classification Search
CPC ............. H04W 36/0061; H04W 8/183; H04W 36/0058; H04W 36/00837;
(Continued)

(56) References Cited

U.S. PATENT DOCUMENTS

2017/0105193 A1 4/2017 Liu et al.
2017/0280366 A1 9/2017 Sahu et al.
(Continued)

FOREIGN PATENT DOCUMENTS

CN 105592439 A 5/2016
CN 106130618 A 11/2016
(Continued)

OTHER PUBLICATIONS

Vivo, vivo views on NR Rel-17. 3GPP TSG RAN Meeting #84, Newport Beach, USA, Jun. 3-6, 2019, RP-190833, 22 pages.
(Continued)

*Primary Examiner* — Abdullahi E Salad
(74) *Attorney, Agent, or Firm* — WOMBLE BOND DICKINSON (US) LLP

(57) ABSTRACT

This application provides a communication method and a terminal device. The terminal device includes a radio frequency transmit channel, a first SIM card interface, and a second SIM card interface. A method performed by the terminal device can include, when the terminal device needs to perform a first voice service, disconnecting the terminal device from the 5G network, and connecting the terminal device to a first LTE network by using the first SIM card. The method can also include performing the first voice service through the first LTE network, and receiving a first connection request from a second LTE network, where the first connection request is used to request the terminal device to perform a second voice service, and the second voice service is related to the second SIM card. Furthermore, the
(Continued)

method can include responding to the first connection request by occupying the radio frequency transmit channel in a time division manner in a process of performing the first voice service.

20 Claims, 19 Drawing Sheets

(58) Field of Classification Search
CPC ..... H04W 36/00222; H04W 36/00838; H04W 76/16; H04W 88/06
See application file for complete search history.

(56) References Cited

U.S. PATENT DOCUMENTS

| | | | |
|---|---|---|---|
| 2018/0255567 A1 | 9/2018 | Keshav et al. | |
| 2020/0037380 A1* | 1/2020 | Qiu | H04W 68/12 |
| 2020/0245292 A1* | 7/2020 | Huang | H04W 68/12 |
| 2020/0267605 A1* | 8/2020 | Bae | G06F 9/547 |

FOREIGN PATENT DOCUMENTS

| | | |
|---|---|---|
| CN | 106488536 A | 3/2017 |
| CN | 108377225 A | 8/2018 |
| CN | 109315017 A | 2/2019 |
| CN | 109451549 A | 3/2019 |
| CN | 109982402 A | 7/2019 |
| CN | 110022588 A | 7/2019 |
| EP | 3591948 A1 | 1/2020 |
| WO | 2018171012 A1 | 9/2018 |
| WO | 2018176675 A1 | 10/2018 |
| WO | 2019071612 A1 | 4/2019 |

OTHER PUBLICATIONS

China Telecom, vivo, Motivation for SI on multi-SIM devices in RAN, 3GPP TSG RAN Meeting #83, RP-190248, Shenzhen, China, Mar. 18-21, 2019, 3 pages.

Huawei, HiSilicon, Overview of Rel-17 work areas for NR and LTE, 3GPP TSG RAN Meeting #84, RP-191007, Newport Beach, USA, Jun. 3-6, 2019 , 22 pages.

Ou weilai, Design and Implement of the Double Card Mobile Intelligent Switching System Based on Semantic, 2018, 2 pages (abstract).

"3rd Generation Partnership Project; Technical Specification GroupServices and System Aspects; Procedures for the 5G System; Stage 2(Release 16)", 3GPP TS 23.502, vol. SA WG2, No. V16.1.1, Jun. 11, 2019(Jun. 11, 2019), pp. 1-495.

Qualcomm Incorporated: "Establishment Cause for Voice andVideo", 3GPP Draft; R2-1811044_ Voice_Video_Estcause, vol. RAN WG2, No. Gothenburg, Sweden; Aug. 20, 2018-Aug. 24, 2018 Aug. 10, 2018 (Aug. 10, 2018).

* cited by examiner

1005: Exchange RRC signaling

1006: Send an INVITE message

1007: Send response information

1008: Send incoming call information

1009: Perform an incoming call notification

FIG. 10B

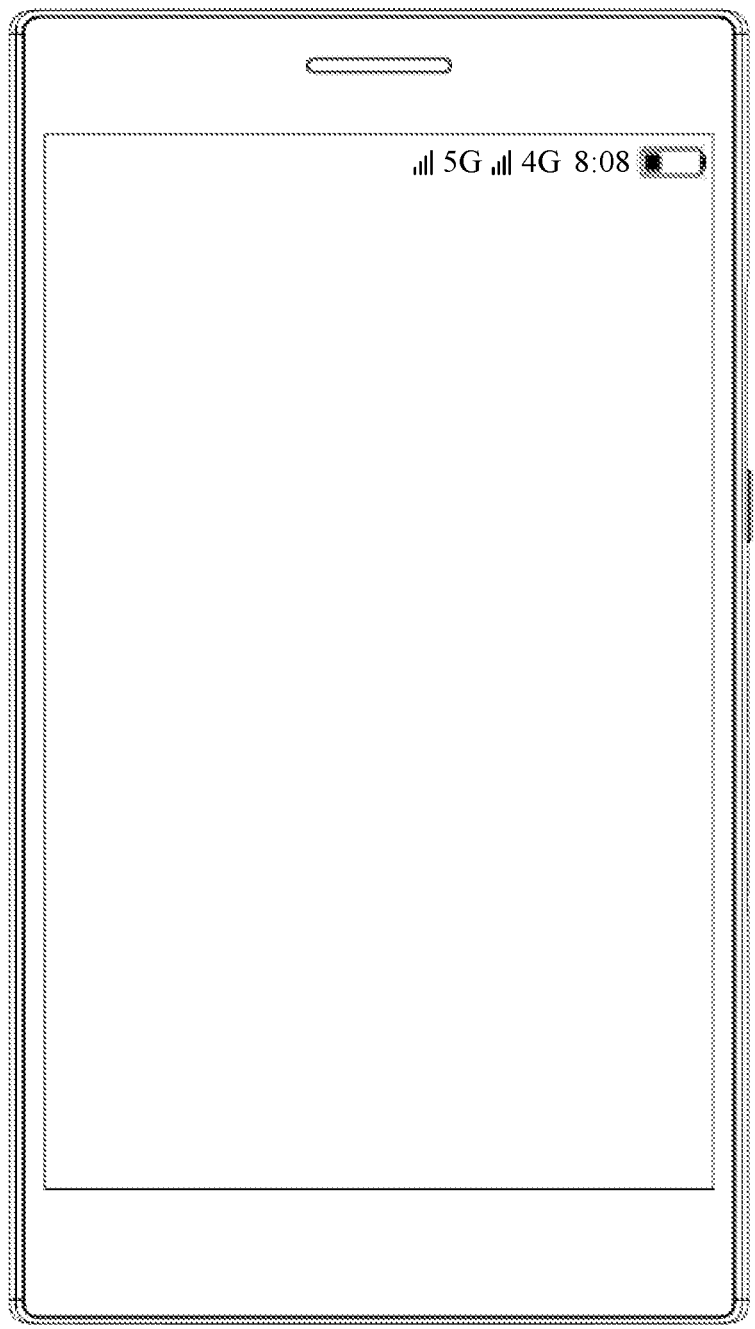
FIG. 13A1

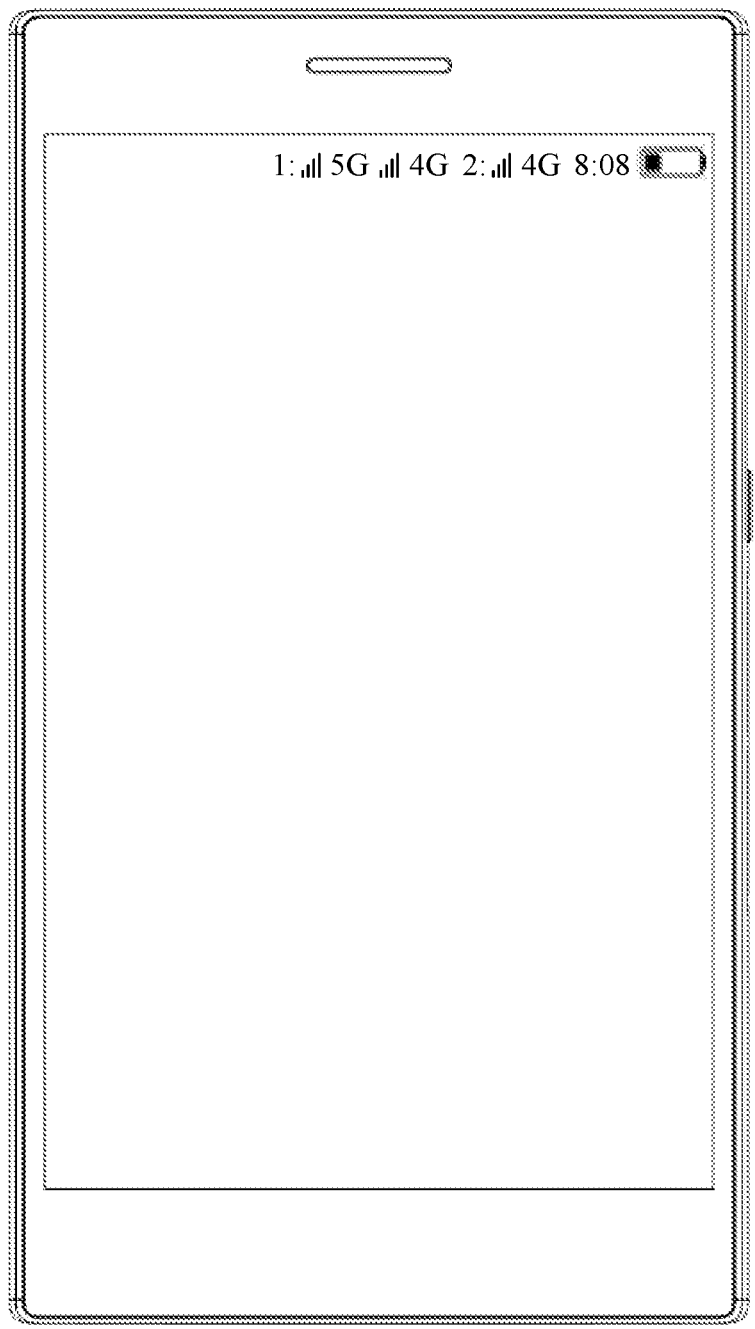
FIG. 13A2

COMMUNICATION METHOD AND TERMINAL DEVICE

CROSS-REFERENCE TO RELATED APPLICATIONS

This application is a national stage application of International Application No. PCT International Application PCT/CN2020/103076, filed on Jul. 20, 2022, which claims priority to Chinese Patent Application No. 201910678751.1, filed on Jul. 25, 2019, and to Chinese Patent Application No. 201910688868.2, filed on Sep. 19, 2019, which are incorporated herein by reference in their entireties.

TECHNICAL FIELD

The present invention relates to the communications field, and in particular, to a communication method and a terminal device.

BACKGROUND

Voice over long-term evolution (VoLTE) is an Internet protocol (IP)-based voice solution defined by the Global System for Mobile Communications Association (GSMA). For a terminal device (for example, a mobile phone) that supports dual receive single transmit, when two subscriber identification module (SIM) cards installed on the terminal device are both located in a network that meets an LTE network standard, both the two SIM cards may be in a standby state. In addition, in a process in which the terminal device performs a VoLTE-based voice service by using one SIM card, the terminal device may further receive incoming call information related to the other SIM card.

Specifically, two radio frequency receive channels and one radio frequency transmit channel are usually configured for a transceiver of the terminal device that supports dual receive single transmit. When the terminal device accesses an LTE network and occupies one radio frequency receive channel and one radio frequency transmit channel to perform a VoLTE-based voice service related to one SIM card, the terminal device may further receive, through the other radio frequency receive channel, a connection request initiated by another LTE network for the other SIM card. The connection request is used to request the terminal device to perform a VoLTE-based voice service by using the other SIM card.

However, with deployment and application of a fifth generation (5G) network, for the terminal device that supports dual receive single transmit, when one SIM card installed on the terminal device may support the terminal device in accessing the 5G network, and the other SIM card installed on the terminal device may support the terminal device in accessing the LTE network meeting the LTE network standard, in a process in which the terminal device performs a voice service by using one SIM card, how to enable a user learn incoming call information related to the other SIM card becomes an urgent problem to be resolved.

SUMMARY

Embodiments of this application provide a communication method and a terminal device, so that when one SIM card installed on the terminal device may support the terminal device in being connected to a 5G network, and the other SIM card installed on the terminal device may support the terminal device in accessing an LTE network meeting an LTE network standard, in a process in which the terminal device performs a voice service by using one SIM card, a user can learn incoming call information related to the other SIM card.

The embodiments of this application provide at least the following technical solutions.

According to a first aspect, a terminal device is provided. The terminal device includes a radio frequency transmit channel, a first SIM card interface, and a second SIM card interface. The first SIM card interface is configured to communicate with a first SIM card, and the second SIM card interface is configured to communicate with a second SIM card. The terminal device is connected to a 5G network by using the first SIM card, and the terminal device further includes a processor. The processor is configured to:

disconnect the terminal device from the 5G network and connect the terminal device to a first LTE network by using the first SIM card when the terminal device needs to perform a first voice service;

when the first voice service is related to the first SIM card, perform the VoLTE-based first voice service through the first LTE network, and receive a first connection request from a second LTE network, where the first connection request is used to request the terminal device to perform a VoLTE-based second voice service, and the second voice service is related to the second SIM card; and respond to the first connection request by occupying the radio frequency transmit channel in a time division manner in a process of performing the first voice service.

In a possible embodiment, the processor is further configured to:

when the first voice service is related to the second SIM card, perform the first voice service through the second LTE network, and receive a second connection request from the first LTE network, where the second connection request is used to request the terminal device to perform a third voice service related to the first SIM card; and respond to the second connection request by occupying the radio frequency transmit channel in the time division manner in the process of performing the first voice service.

In a possible embodiment, the processor is specifically configured to:

when the terminal device needs to perform the first voice service, send a signal measurement report to a first base station in the 5G network, where the signal measurement report is used to indicate that signal quality of the first base station in the 5G network relative to the terminal device does not meet a preset condition;

receive a handover instruction sent by the first base station, where the handover instruction includes access information allocated by a second base station in the first LTE network to the terminal device;

update, by using the access information, access information that is in the terminal device and that is related to the first SIM card; and send a confirmation message to the second base station in the first LTE network.

In a possible embodiment, the processor is specifically configured to:

when the terminal device needs to perform the first voice service, send secondary cell group (SCG) failure signaling to a second base station in the first LTE network, where the SCG failure signaling is used to indicate the second base station to exchange information with a first base station in the 5G network, so that the first base station releases a radio resource control (RRC) between the first base station and the terminal device; and receive an RRC release message from the first base station, where the RRC release message is used to indicate the terminal device to perform, based on an RRC connection between the second base station and the terminal device, a voice service and/or a data service related to the first SIM card.

In a possible embodiment, a network management module is specifically configured to: when the terminal device needs to perform the first voice service, disconnect the terminal device from the 5G network by reselecting a public land mobile network (public land mobile network, PLMN), and connect the terminal device to the first LTE network by using the first SIM card.

In a possible embodiment, the processor is further configured to: before disconnecting the terminal device from the 5G network, measure signal quality of the 5G network; and after disconnecting the terminal device from the 5G network, stop measuring the signal quality of the 5G network.

In a possible embodiment, the processor is specifically configured to: when an INVITE message used to request the terminal device to perform the first voice service is received, disconnect the terminal device from the 5G network, and connect the terminal device to the first LTE network by using the first SIM card.

In a possible embodiment, the processor is specifically configured to: in response to a request operation of a user for the first voice service, disconnect the terminal device from the 5G network, and connect the terminal device to the first LTE network by using the first SIM card.

According to a second aspect, a communication method is provided, applied to a terminal device. The terminal device includes a radio frequency transmit channel, a first SIM card interface, and a second SIM card interface. The first SIM card interface is configured to communicate with a first SIM card, the second SIM card interface is configured to communicate with a second SIM card, and the terminal device is connected to a 5G network by using the first SIM card. The method includes:

disconnecting the terminal device from the 5G network and connecting the terminal device to a first LTE network by using the first SIM card when the terminal device needs to perform a first voice service;

when the first voice service is related to the first SIM card, performing the VoLTE-based first voice service through the first LTE network, and receiving a first connection request from a second LTE network, where the first connection request is used to request the terminal device to perform a VoLTE-based second voice service, and the second voice service is related to the second SIM card; and respond to the first connection request by occupying the radio frequency transmit channel in a time division manner in a process of performing the first voice service.

In a possible embodiment, the method further includes: when the first voice service is related to the second SIM card, performing the first voice service through the second LTE network, and receiving a second connection request from the first LTE network, where the second connection request is used to request the terminal device to perform a third voice service related to the first SIM card; and responding to the second connection request by occupying the radio frequency transmit channel in the time division manner in the process of performing the first voice service.

In a possible embodiment, the disconnecting the terminal device from the 5G network and connecting the terminal device to a first LTE network by using the first SIM card includes:

sending a signal measurement report to a first base station in the 5G network, where the signal measurement report is used to indicate that signal quality of the first base station in the 5G network relative to the terminal device does not meet a preset condition;

receiving a handover instruction sent by the first base station, where the handover instruction includes access information allocated by a second base station in the first LTE network to the terminal device;

updating, by using the access information, access information that is in the terminal device and that is related to the first SIM card; and sending a confirmation message to the second base station in the first LTE network.

In a possible embodiment, the disconnecting the terminal device from the 5G network and connecting the terminal device to a first LTE network by using the first SIM card includes:

sending SCG failure signaling to a second base station in the first LTE network, where the SCG failure signaling is used to indicate the second base station to exchange information with a first base station in the 5G network, so that the first base station releases an RRC connection between the first base station and the terminal device; and receiving an RRC release message from the first base station, where the RRC release message is used to indicate the terminal device to perform, based on an RRC connection between the second base station and the terminal device, a voice service and/or a data service related to the first SIM card.

In a possible embodiment, the disconnecting the terminal device from the 5G network and connecting the terminal device to a first LTE network by using the first SIM card includes: disconnecting the terminal device from the 5G network by reselecting a PLMN, and connecting the terminal device to the first LTE network by using the first SIM card.

In a possible embodiment, before the disconnecting the terminal device from the 5G network, the method further includes: measuring signal quality of the 5G network; and after the disconnecting the terminal device from the 5G network, the method further includes: stopping measuring the signal quality of the 5G network.

In a possible embodiment, the disconnecting the terminal device from the 5G network and connecting the terminal device to a first LTE network by using the first SIM card when the terminal device needs to perform a first voice service includes: when the terminal device receives an INVITE message used to request the terminal device to perform the first voice service, disconnecting the terminal device from the 5G network, and connecting the terminal device to the first LTE network by using the first SIM card.

In a possible embodiment, the disconnecting the terminal device from the 5G network and connecting the terminal device to a first LTE network by using the first SIM card when the terminal device needs to perform a first voice service includes: in response to a request operation of a user for the first voice service, disconnecting the terminal device from the 5G network, and connecting the terminal device to the first LTE network by using the first SIM card.

According to a third aspect, a terminal device is provided. The terminal device includes a first radio frequency transmit channel, a second radio frequency transmit channel, a first SIM card interface, and a second SIM card interface. The first SIM card interface is configured to communicate with a first SIM card, and the second SIM card interface is configured to communicate with a second SIM card. The terminal device is connected to a 5G network and a first long-term evolution LTE network by using the first SIM card, and the terminal device further includes a processor. The processor is configured to:

perform a VoLTE-based first voice service through the first LTE network, where the first voice service is related to the first SIM card;

in a process of performing the first voice service, send one or more service data packets related to a data service to the 5G network through the first radio frequency transmit channel, and receive a connection request from a second LTE network, where the connection request is used to request the terminal device to perform a VoLTE-based second voice service, and the second voice service is related to the second SIM card; and respond to the connection request by occupying the second radio frequency transmit channel in a time division manner in the process of performing the first voice service.

In a possible embodiment, the processor is further configured to: in the process of performing the first voice service, send the one or more service data packets related to the data service to the first LTE network through the second radio frequency transmit channel.

According to a fourth aspect, a communication method is provided, applied to a terminal device. The terminal device includes a first radio frequency transmit channel, a second radio frequency transmit channel, a first SIM card interface, and a second SIM card interface. The first SIM card interface is configured to communicate with a first SIM card, the second SIM card interface is configured to communicate with a second SIM card, and the terminal device is connected to a 5G network and a first long-term evolution LTE network by using the first SIM card. The method includes:

performing a VoLTE-based first voice service through the first LTE network, where the first voice service is related to the first SIM card;

in a process of performing the first voice service, sending one or more service data packets related to a data service to the 5G network through the first radio frequency transmit channel, and receiving a connection request from a second LTE network, where the connection request is used to request the terminal device to perform a VoLTE-based second voice service, and the second voice service is related to the second SIM card; and responding to the connection request by occupying the second radio frequency transmit channel in a time division manner in the process of performing the first voice service.

In a possible embodiment, the method further includes: in the process of performing the first voice service, sending the one or more service data packets related to the data service to the first LTE network through the second radio frequency transmit channel.

According to a fifth aspect, a communication method is provided, applied to a terminal device. The terminal device includes a first radio frequency receive channel, a second radio frequency receive channel, a radio frequency transmit channel, a first SIM card interface, and a second SIM card interface. The first SIM card interface is configured to communicate with a first SIM card, and the second SIM card interface is configured to communicate with a second SIM card. The terminal device is connected to a 5G network and a first long-term evolution LTE network by using the first SIM card, and the terminal device camps, by using the second SIM card, on a cell managed by a base station in a second LTE network. The method includes:

The terminal device is disconnected from the 5G network and accesses the first long-term evolution LTE network by using the first SIM card when the terminal device needs to perform a first voice service, where the first voice service is related to one of the first SIM card and the second SIM card.

The terminal device performs the VoLTE-based first voice service through the first LTE network or the second LTE network corresponding to the SIM card, and receives a connection request through the second radio frequency receive channel. The first voice service occupies the first radio frequency receive channel and the radio frequency transmit channel, the connection request is used to request the terminal device to perform a VoLTE-based second voice service, and the second voice service is related to the other of the first SIM card and the second SIM card.

The terminal device responds to the connection request by occupying the second radio frequency transmit channel in a time division manner in a process of performing the first voice service.

According to a sixth aspect, a computer-readable storage medium is provided, configured to store instructions. When the instructions are executed by a processor of a terminal device, the terminal device is enabled to implement the communication method according to any one of the second aspect, the fourth aspect, or the fifth aspect.

According to a seventh aspect, a computer program product is provided. The computer program product includes computer program code, and when the computer program code is run on a computer, the computer is enabled to perform the communication method performed by the terminal device in any embodiment of this application.

According to an eighth aspect, a chip system is provided. The chip system includes a processor, configured to implement a function of the terminal device according to any one of the foregoing aspects, for example, receive or process data and/or information in the method according to any one of the foregoing aspects. In a possible design, the chip system further includes a memory. The memory is configured to store program instructions and/or data. The chip system may include a chip, or may include a chip and another discrete component.

According to the technical solutions provided in the embodiments of this application, when the terminal device needs to perform a first voice service related to one SIM card, the terminal device is actively disconnected from the 5G network and is connected to the first LTE network by using the first SIM card. In this way, when receiving a connection request from the second LTE network, the terminal device is located in two LTE networks that meet the LTE network standard. In a process of performing the first voice service related to the SIM card, the terminal device can respond, by occupying the radio frequency transmit channel in the time division manner, to a connection request used to request the terminal device to perform a second voice service related to the other SIM card, so that the terminal device receives and provides incoming call information related to the other SIM card to the user.

BRIEF DESCRIPTION OF DRAWINGS

The following briefly describes the accompanying drawings used to describe the embodiments or the conventional technology.

FIG. 10A and FIG. 10B are a schematic diagram of a process in which a terminal device performs an incoming call notification for a second voice service in a process of performing a first voice service according to an embodiment of this application;

FIG. 13A1 is a graphical user interface 1 that may be displayed when a terminal device according to an embodiment of this application performs a communication method according to an embodiment of this application;

FIG. 13A2 is a graphical user interface 2 that may be displayed when a terminal device according to an embodiment of this application performs a communication method according to an embodiment of this application;

DESCRIPTION OF EMBODIMENTS

The following describes the technical solutions in embodiments of this application with reference to the accompanying drawings in the embodiments of this application.

Figure 1:
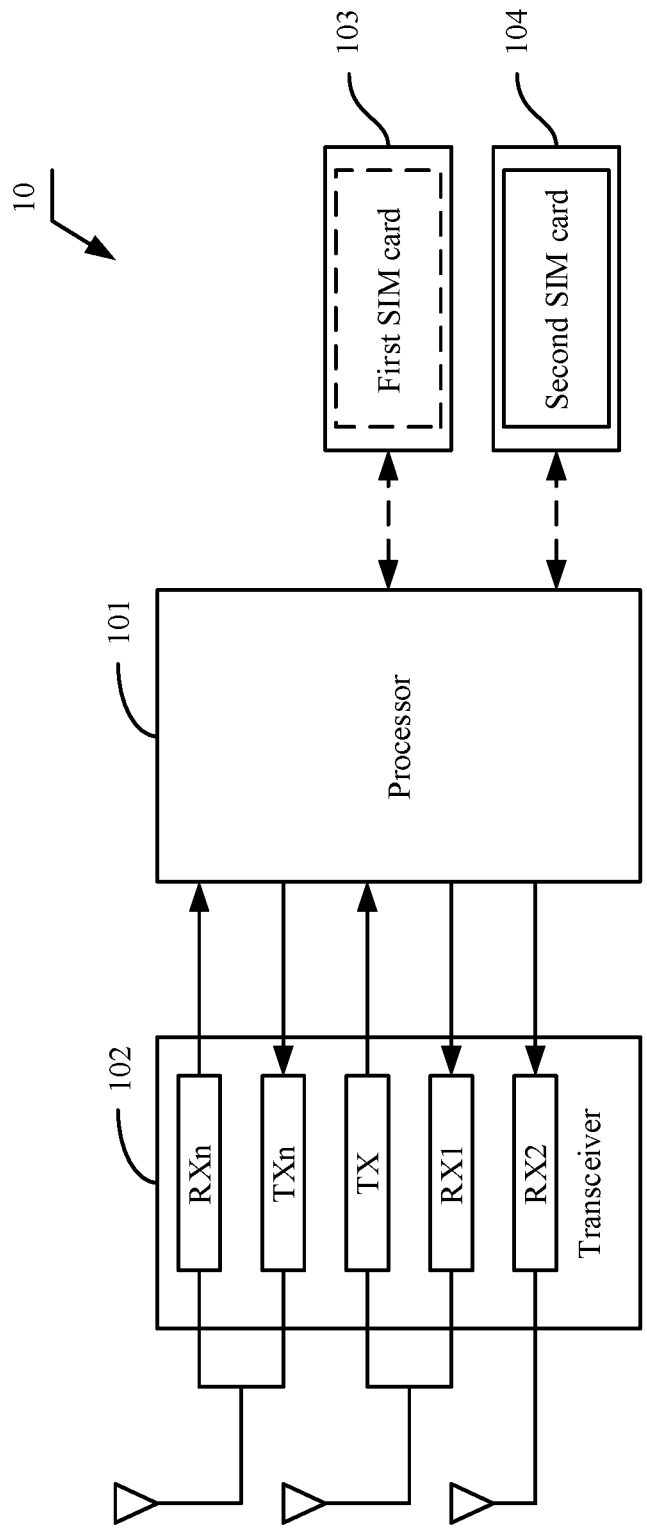
FIG. 1 is a schematic diagram of a structure of a terminal device according to an embodiment of this application.

FIG. 1 is a schematic diagram of a structure of a terminal device according to an embodiment of this application. As shown in FIG. 1, a terminal device 10 may include at least a processor 101, and a transceiver 102, a first SIM card interface 103, and a second SIM card interface 104 that are coupled to the processor 101.

The transceiver 102 includes a first radio frequency receive channel RX1, a second radio frequency receive channel RX2, and a first radio frequency transmit channel TX. The RX1, the RX2, and the TX are configured to support the terminal device in exchanging information with an LTE standard network. The transceiver 102 further includes a third radio frequency receive channel RXn and a second radio frequency transmit channel TXn, and the RXn and the TXn are configured to support the terminal device in exchanging information with a 5G network. Conventionally, the TX and the RX1 may be referred to as primary channels, the RX2 may be referred to as a secondary channel, and the RXn and the TXn may be referred to as 5G-dedicated channels. Time division multiplexing mainly refers to multiplexing of the TX in the primary channels, and is described by using examples in subsequent embodiments.

It may be understood that different radio frequency transmit channels may concurrently send data, and different radio frequency receive channels may concurrently receive data.

As a control center of the terminal device 10, the processor 101 may include one or more processing units, be connected to other components of the terminal device 10 through various types of interfaces and lines, and implement various functions of the terminal device by running or executing a computer program.

Specifically, the processor 101 may integrate an application processor by using one or more processing units, integrate a first modem related to a first SIM card by using one or more processing units, and integrate a second modem related to a second SIM card by using one or more processing units. The application processor is mainly configured to run an operating system and a computer program that supports the terminal device in implementing the various functions. The first modem and the second modem are respectively configured to process data in a voice service and a data service that are related to the first SIM card and in a voice service related to the second SIM card, for example, are configured to implement conversion between a digital signal and an analog signal that are related to voice data. It may be understood that the first modem and the second modem may alternatively be components that are relatively independent of the processor.

It may be understood that the terminal device includes but is not limited to a mobile phone that may support dual receive single transmit under two LTE networks, for example, may further include a smart band and a tablet computer that support dual receive single transmit.

For example, the terminal device includes a mobile phone that supports dual receive single transmit. The mobile phone may further include a memory, and the memory is connected to the processor 101. The memory may be configured to store a computer program, for example, store an operating system that enables the mobile phone to run, including but not limited to an Android® operating system or a Windows® operating system, and for another example, store an application required for supporting the mobile phone in implementing various functions (for example, a sound playing function and an image playing function) of the mobile phone. The memory may further be configured to store data, for example, store data (for example, audio data) created based on use of the mobile phone by a user. Specifically, the memory may include a high-speed random access memory, and may further include a non-volatile memory, for example, at least one magnetic disk storage component, a flash component, or another volatile solid-state storage component.

The mobile phone may further include an input device. The input device may be configured to: receive entered digit or character information, and generate a signal input related to user settings and function control of the mobile phone. For example, the input device may include a touch panel disposed on the front of the mobile phone. The touch panel may collect a touch operation of the user on or near the touch panel (for example, an operation performed by the user on or near the touch panel by using any appropriate object or accessory, for example, a finger or a stylus), and drive a corresponding connection apparatus according to a preset program. The touch panel may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and then sends the touch point coordinates to the processor 110, and can receive and execute an instruction sent by the processor 110.

The mobile phone may further include a display. The display may be connected to the processor 110 by using a display controller. The display may display, under control of the display controller, information input by the user or information provided for the user, for example, display a graphical user interface (GUI) used to carry various operation menus of the mobile phone, or display a graphical user interface carrying incoming call information. The display may include a display panel disposed on the front of the mobile phone, and the display panel may include a liquid crystal display or a display configured based on an organic light-emitting diode.

It should be noted that the touch panel and the display panel may serve as two independent components to implement information input and display functions of the mobile phone. Alternatively, the touch panel and the display panel may be disposed in an integrated manner, to implement information input and display functions of the mobile phone. A display screen that integrates the touch panel and the display panel may be referred to as a touch display screen.

The mobile phone may further include one or more types of sensors, for example, include an optical sensor, a motion sensor, and another sensor. Each sensor may be connected to the processor 101. Specifically, the optical sensor may include an ambient light sensor and an optical proximity sensor. The ambient light sensor may adjust luminance of the display panel based on intensity of ambient light. The optical proximity sensor is disposed on the front of the mobile phone. When the mobile phone is moved to an ear, the mobile phone switches off the display panel based on detection of the optical proximity sensor. This can further reduce power consumption of the mobile phone. As one type of motion sensor, an accelerometer sensor may detect magnitude of accelerations in various directions (generally on three axes), may detect magnitude and a direction of gravity when the mobile phone stays still, and may be used in an application for identifying a mobile phone posture (for example, switching between landscape orientation and portrait orientation, a related game, and magnetometer posture calibration), a function related to vibration identification (for example, a pedometer or a knock), and the like. For another sensor, for example, a gyroscope, a barometer, a hygrometer, a thermometer, or an infrared sensor that may further be configured for the mobile phone, details are not described herein.

The mobile phone may further include a speaker, a microphone, and a codec. The microphone and the speaker may be connected to the processor 101 by using the codec. The codec may convert audio data from the processor into an electrical signal and transmit the electrical signal to the speaker, and the speaker forms a sound signal based on the received electrical signal and outputs the sound signal. The microphone may convert a collected sound signal into an electrical signal. The codec may convert the electrical signal from the microphone into audio data, and then output the audio data converted by the codec to the processor 101, or send the audio data to another terminal device by using the transceiver 102, or store the audio data in the memory by using the processor 101 for further processing.

The mobile phone may further include a function module configured to support various forms of near field communication, for example, a Wi-Fi module. The mobile phone may access the Internet by using the Wi-Fi module without relying on the first SIM card or the second SIM card.

The mobile phone may further include a power module configured to supply power to another component in the mobile phone. The power module may be connected to the processor 101 by using a power management system, to implement a function, for example, managing charging, discharging, and power consumption of the mobile phone, by using the power management system. The power module may further be configured to supply working power to the display panel, the touch panel, and the processor.

It may be understood that the mobile phone may further include another component configured to support the mobile phone in implementing a specific function. Other components that may further be included in the mobile phone are not described herein again.

In this embodiment of this application, the terminal device performing a VoLTE-based voice service related to the first SIM card or the second SIM card means that the terminal device performs a VoLTE-based voice call with another terminal device under an operation of the user by using the first SIM card or the second SIM card.

In this embodiment of this application, in a process of performing a VoLTE-based first voice service by using one SIM card, the terminal device not only needs to occupy the TX to send one or more voice data packets, and occupy the radio frequency receive channel RX1 to receive one or more voice data packets, but also may need to occupy the TX to send one or more signaling packets, specifically, for example, a scheduling request (SR) packet, an acknowledgment (ACK) packet, a channel quality indicator (CQI) packet, and a response information packet that are related to the first voice service, and occupy one RX1 to receive one or more signaling packets related to the first voice service.

The voice data packet is a data packet that is generated in a process of performing a voice service and that includes voice data. The service data packet is a data packet that is exchanged, when the terminal device accesses an application server or an electronic device providing a specific service, between the terminal device and the application server or the electronic device providing the specific service and that includes service data.

In this embodiment of this application, a specific process in which the terminal device responds to a connection request may require that the terminal device exchanges information with one or more devices on a network side for one or more times. This is described by using examples in subsequent embodiments.

In this embodiment of this application, if the terminal device is in a sleep state (an RCC idle state or unactivated state), the terminal device may usually camp, by using the first SIM card, on a cell managed by a base station in the 5G network; camp, by using the first SIM card, on a cell managed by a base station in a first LTE network; and camp, by using the second SIM card, on a cell managed by a base station in a second LTE network. In this case, the terminal device may receive, through the RXn, a paging request related to the first SIM card from the 5G network, receive, through the RX1, a paging request related to the first SIM card from the first LTE network, or receive, through the RX2, a paging request related to the second SIM card from the second LTE network, and enter a non-sleep state. It may be understood that the paging request received by the terminal device may trigger the terminal device to establish an RRC connection to a network device in the 5G network, the first LTE network, or the second LTE network by using the first SIM card or the second SIM card, so that the terminal device enters the non-sleep state (an RCC connected state). When the terminal device is in the non-sleep state, the terminal device may be preferentially connected to the 5G network by using the first SIM card, so that the user performs a data service through the 5G network. To be specific, when the terminal device is connected to the 5G network by using the first SIM card, the terminal device is not necessarily connected to the first LTE network by using the first SIM card. It should be noted that the terminal device being connected to the 5G network by using the first SIM card includes but is not limited to that the terminal device establishes an RRC connection to the base station in the 5G network by using the first SIM card, for example, may further include that the terminal device establishes a protocol data unit (PDU) session with one or more user plane function (UPF) entities in the 5G network based on the established RRC connection between the terminal device and the network device in the 5G network, so that the terminal device can access the Internet through the 5G network.

In conclusion, in a process in which the user uses the terminal device, when the terminal device needs to perform the first voice service, the terminal device is usually connected to the 5G network by using the first SIM card. To be specific, the terminal device establishes and activates the RRC connection between the terminal device and the 5G network by using the first SIM card, and is connected to the second LTE network by using the second SIM card.

In this embodiment of this application, networking modes of the 5G network and the first LTE network may be standalone. When the 5G network and the first LTE network are standalone, the terminal device may access the 5G network or access the first LTE network by using the first SIM card. To be specific, the terminal device may maintain the RRC connection to the network device (for example, the base station) in the 5G network or maintain the RRC connection to the network device in the first LTE network by using the first SIM card.

In this embodiment of this application, the networking modes of the 5G network and the first LTE network may alternatively be non-standalone. When the 5G network and the first LTE network are non-standalone, the 5G network and the first LTE network may have a same core network. To be specific, new radio (new radio, NR) of the 5G network and a radio access network of the first LTE network may be connected to the same core network, for example, connected to a 5G core (5GC) or an evolved packet core (EPC). In this case, a second base station included in the radio access network of the first LTE network may serve as a primary base station, a first base station included in the new radio of the 5G network may serve as a secondary base station, and the primary base station maintains dual connectivity (DC) to the secondary base station. The secondary base station does not need to exchange RRC signaling with the terminal device, and only the primary base station needs to exchange RRC signaling with the terminal device, so that the terminal device can learn access information allocated by the secondary base station to the terminal device and access information allocated by the primary base station to the terminal device. In this way, the terminal device maintains an RRC connection to each of the primary base station and the secondary base station by using the first SIM card. To be specific, the terminal device is connected to both the 5G network and the first LTE network.

Correspondingly, in this embodiment of this application, the terminal device being disconnected from the 5G network and being connected to the first LTE network by using the first SIM card essentially means that the RRC connection established to the network device (for example, the base station) in the 5G network by using the first SIM card is no longer maintained between the terminal device and the network device, but it needs to be ensured that an RRC connection related to the first SIM card exists between the terminal device and the first LTE network. How the terminal device is disconnected from the 5G network and is connected to the first LTE network by using the first SIM card is described by using examples in subsequent embodiments.

Figure 2:
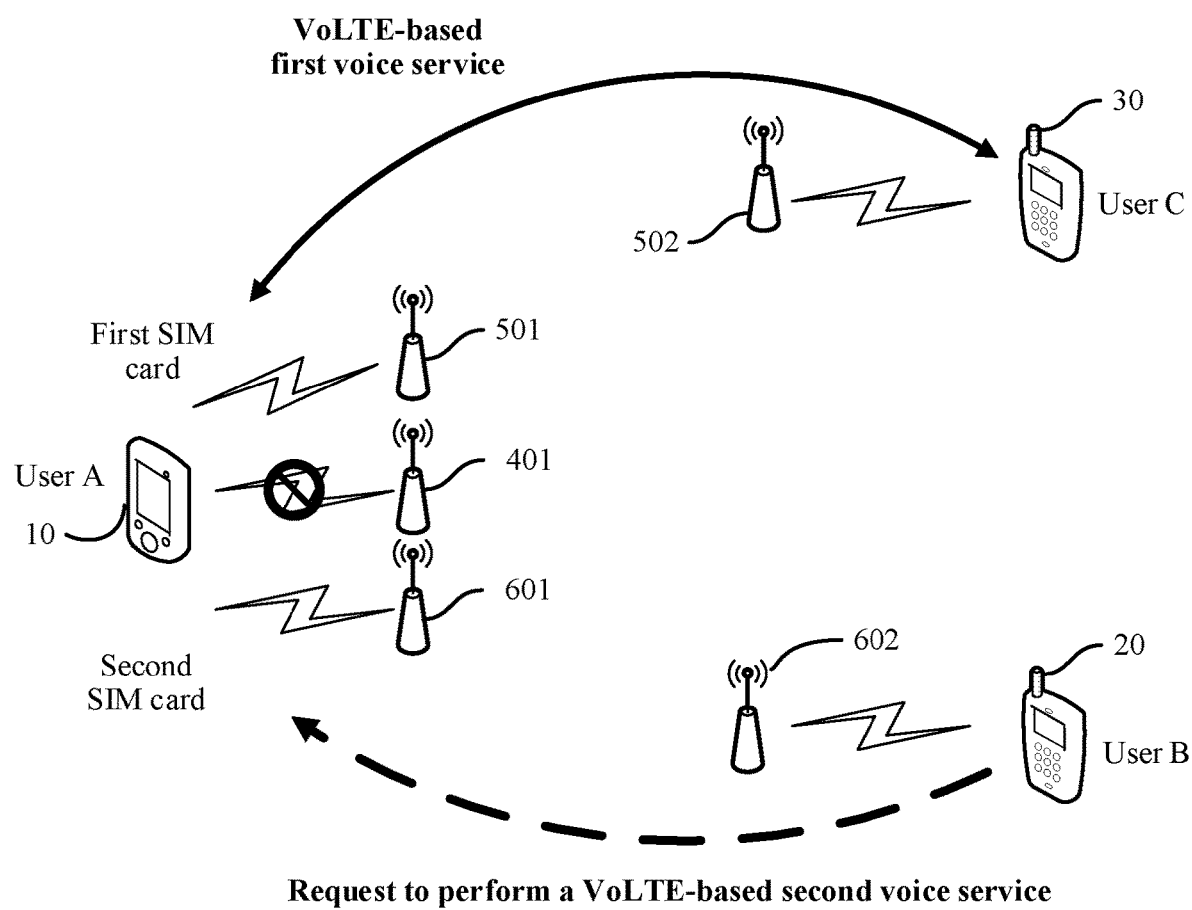
FIG. 2 is a schematic diagram of an application scenario to which an embodiment of this application is applicable.

With reference to FIG. 2, the following provides an example description for an application scenario to which an embodiment of this application is applicable. As shown in FIG. 2, a terminal device 10 used by a user A may be a mobile phone that may support dual receive single transmit under two LTE networks, and a first SIM card and a second SIM card may be installed on the terminal device 10. The first SIM card may be a pre-specified primary card configured to support the terminal device 10 in performing a data service, and the second SIM card may be a pre-specified secondary card. The terminal device 10 may be connected to a 5G network by using the first SIM card, to support the terminal device 10 in performing the data service, that is, maintain an RRC connection to a base station 401 in the 5G network by using the first SIM card. In this case, the terminal device 10 may camp, by using the second SIM card, on a cell managed by a base station in a second LTE network, or the terminal device may establish, by using the second SIM card, an RRC connection to the cell managed by the base station in the second LTE network.

When the user A needs to use the terminal device 10 to perform a voice service with a terminal device 30 used by a user C, the terminal device 10 is disconnected from the 5G network and is connected to a first LTE network, that is, no longer maintains the RRC connection between the terminal device 10 and the base station 401, and establishes or activates an RRC connection to a base station 501 in the first LTE network. Then, the terminal device 10 may perform, with the terminal device 30 through the first LTE network including the base station 501 and a base station 502, a first VoLTE-based voice service related to the first SIM card.

In a process in which the terminal device 10 performs the first voice service, the terminal device 10 is connected, by using the first SIM card and the second SIM card, to two LTE networks that meet an LTE network standard. When a terminal device 20 used by a user B needs to perform a voice service related to the second SIM card with the terminal device 10 used by the user A, the terminal device 20 may send, via a base station 602 that establishes an RRC connection to the terminal device 20, an INVITE message used to request the terminal device 10 to perform the voice service. In this case, the terminal device 10 sends a connection request (for example, a paging request or the INVITE message) to the terminal device 10 via the base station 601. The terminal device 10 may respond to the received connection request by occupying a radio frequency transmit channel TX of the terminal device 10 in a time division manner, for example, establish an RRC connection to and further exchange session initiation protocol (session initiation protocol, SIP) signaling with the base station 601 in the second LTE network by using the second SIM card. Then, the network device 10 may receive incoming call information that is from the second LTE network and that is related to a second voice service.

It may be understood that the service scenario shown in FIG. 2 is merely an example. For example, the VoLTE-based first voice service may alternatively be a voice service related to the second SIM card. In this case, the terminal device is connected to both the first LTE network and the second LTE network by using the first SIM card and the second SIM card. When the terminal device 30 needs to perform a second voice service related to the first SIM card with the terminal device 10, the base station 501 may directly send an INVITE message instead of a paging request to the terminal device 10. The INVITE message received by the terminal device 10 is a connection request used to request the terminal device to perform the voice service related to the first SIM card.

In conclusion, according to the technical solutions provided in the embodiments of this application, when the terminal device needs to perform a first voice service related to one SIM card, the terminal device is actively disconnected from the 5G network and is connected to the first LTE network by using the first SIM card. In this way, when receiving a connection request from the second LTE network, the terminal device is located in two LTE networks that meet the LTE network standard. In a process of performing the first voice service related to the SIM card, the terminal device can respond, by occupying the radio frequency transmit channel in the time division manner, to a connection request used to request the terminal device to perform a second voice service related to the other SIM card, so that the terminal device receives and provides incoming call information related to the other SIM card to the user.

It may be understood that after the terminal device responds to the connection request, the user may perform a corresponding operation on the terminal device, to select to perform the second voice service and terminate the first voice service, that is, answer an incoming call related to the other SIM card and terminate the first voice service; or perform a corresponding operation on the terminal device to refuse to perform the second voice service. To be specific, in a process of making a call by using the SIM card, the user may learn the incoming call information related to the other SIM card, and may select, by performing the operation on the terminal device, whether to answer the incoming call related to the other SIM card. In this way, user experience is relatively good.

It may be understood that VoLTE is an IP-based voice solution applied to an LTE network, and may support concurrency of a voice service and a data service. Usually, the first SIM card may be set by the user as a primary card configured to support the terminal device in performing a data service. After the terminal device is connected to the first LTE network by using the first SIM card, regardless of whether the terminal device is performing a voice service related to the first SIM card, the terminal device may perform a corresponding data service through the first LTE network.

The following describes the technical solutions in the embodiments of this application in more detail with reference to the accompanying drawings.

Figure 3:
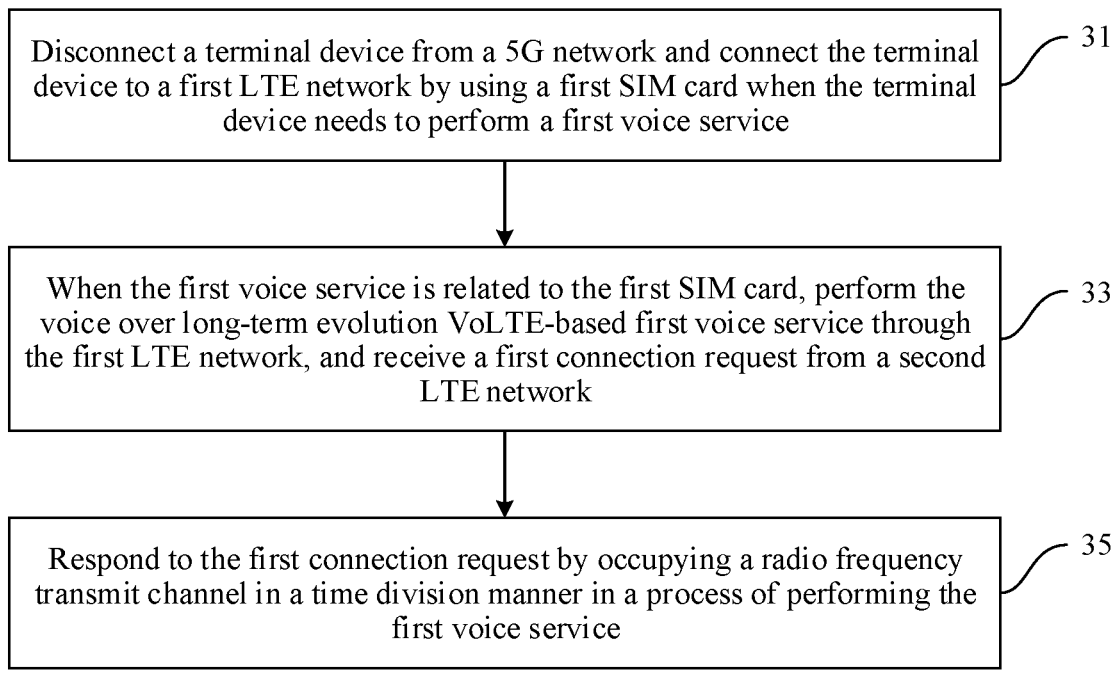
FIG. 3 is a flowchart of a communication method performed by a terminal device according to an embodiment of this application.

FIG. 3 is a flowchart of a communication method according to an embodiment of this application. The communication method may be applied to the terminal device 10 shown in FIG. 1 and FIG. 2. The terminal device 10 includes a first radio frequency receive channel RX1, a second radio frequency receive channel RX2, and a first radio frequency transmit channel TX. The terminal device further includes a first SIM card interface 103 and a second SIM card interface 104. The first SIM card interface 103 is configured to communicate with a first SIM card, the second SIM card interface 104 is configured to communicate with a second SIM card, and the terminal device 10 is connected to a 5G network by using the first SIM card. As shown in FIG. 3, the communication method may include at least the following steps 31, 33, and 35.

First, in step 31, the terminal device is disconnected from the 5G network and is connected to a first LTE network by using the first SIM card when the terminal device needs to perform a first voice service.

Herein, the first voice service may be related to the first SIM card or the second SIM card.

In a possible embodiment, the first voice service may be a voice service actively initiated by the terminal device under an operation of a user. To be specific, in response to a request operation of the user for the first voice service, the terminal device may be disconnected from the 5G network, and is connected to the first LTE network by using the first SIM card.

In another possible embodiment, the first voice service may be a voice service initiated by another device to the terminal device. To be specific, the terminal device may be disconnected from the 5G network, and is connected to the first LTE network by using the first SIM card when receiving a connection request used to request the terminal device to perform the first voice service.

In a relatively specific example, the terminal device may be disconnected from the 5G network, and is connected to the first LTE network by using the first SIM card when receiving an INVITE message used to request the terminal device to perform the first voice service.

In a more specific example, the INVITE message may come from the 5G network or the first LET network. When the INVITE message comes from the 5G network, the INVITE message may be used to request the terminal device to perform a voice over new radio (VONR)-based first voice service. When the INVITE message comes from the first LTE network, the INVITE message may be used to request the terminal device to perform an evolved packet system fallback (EPSFB)-based first voice service, or used to request the terminal device to perform a VoLTE-based first voice service.

In this embodiment of this application, the terminal device may be disconnected from the 5G network, and is connected to the first LTE network by using the first SIM card in at least any one of the following embodiments.

Figure 4:
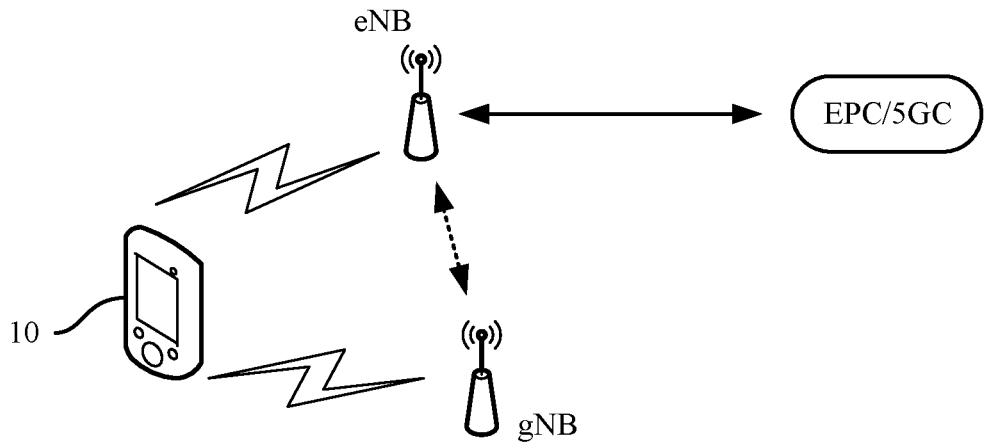
FIG. 4 is a system framework diagram of a network system according to an embodiment of this application.

Embodiment 1: Refer to FIG. 4. Networking modes of the 5G network and the first LTE network are non-standalone, and the 5G network and the first LTE network may share an EPC of the first LTE network or a 5GC of the 5G network. A base station eNB included in a radio access network of the first LTE network may serve as a primary base station, and a base station gNB included in new radio of the 5G network may serve as a secondary base station. Cells covered by the eNB form a primary cell group, cells covered by the gNB form a secondary cell group, and there is dual connectivity between the eNB and the gNB. The terminal device 10 may exchange RRC signaling with the eNB, so that the terminal device 10 establishes an RRC connection to each of the gNB and the eNB, and may exchange a voice data packet and a service data packet by using the RRC connection established between the terminal device 10 and the gNB.

Figure 5:
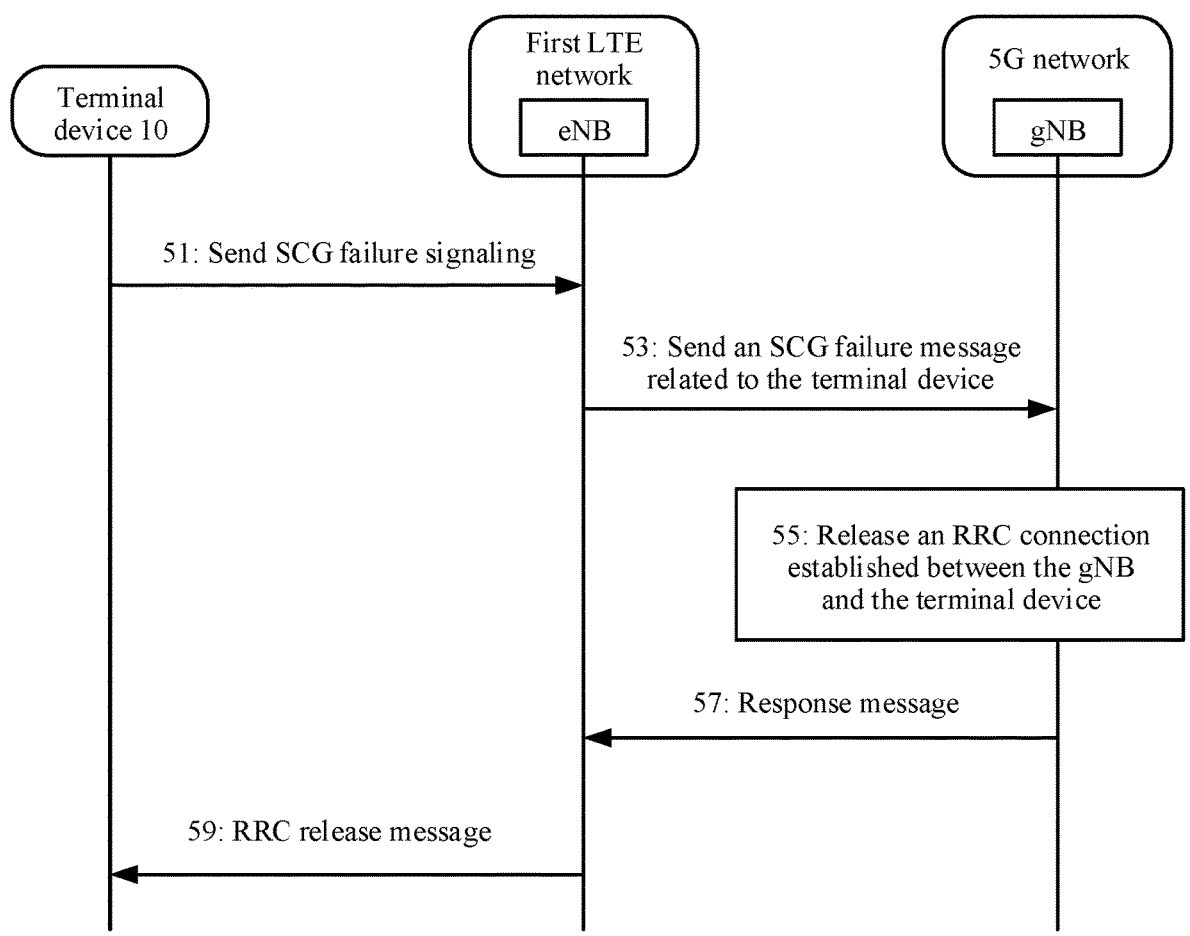
FIG. 5 is a schematic diagram of a process in which a terminal device is disconnected from a 5G network and is connected to a first LTE network according to an embodiment of this application.

Correspondingly, when the terminal device 10, the first LTE network, and the 5G network meet the system framework shown in FIG. 4, as shown in FIG. 5, the following steps 51, 53, 57, and 59 may be performed, so that the terminal device 10 is disconnected from the 5G network, and is connected to the first LTE network by using the first SIM card.

Step 51: The terminal device 10 sends SCG failure signaling to the eNB in the first LTE network.

Step 53: The eNB in the first LTE network sends an SCG failure message related to the terminal device 10 to the gNB in the 5G network in response to the SCG failure signaling.

Step 55: The gNB in the 5G network releases, in response to the SCG failure message, the RRC connection established between the gNB and the terminal device 10.

Step 57: The gNB in the 5G network sends response information to the eNB in the first LTE network.

Step 59: The eNB in the first LTE network sends an RRC release message to the terminal device 10 in response to the response information.

The RRC release message is used to indicate the terminal device 10 to perform, based on the RRC connection between the eNB in the first LTE network and the terminal device 10, a voice service and/or a data service related to the first SIM card. To be specific, the terminal device may use, under an indication of the RRC release message, the RRC connection that is established between the terminal device and the eNB in the first LTE network and that is related to the first SIM card to receive and/or send a voice data packet related to the first voice service and a service data packet related to the data service in a subsequent process.

Figure 6:
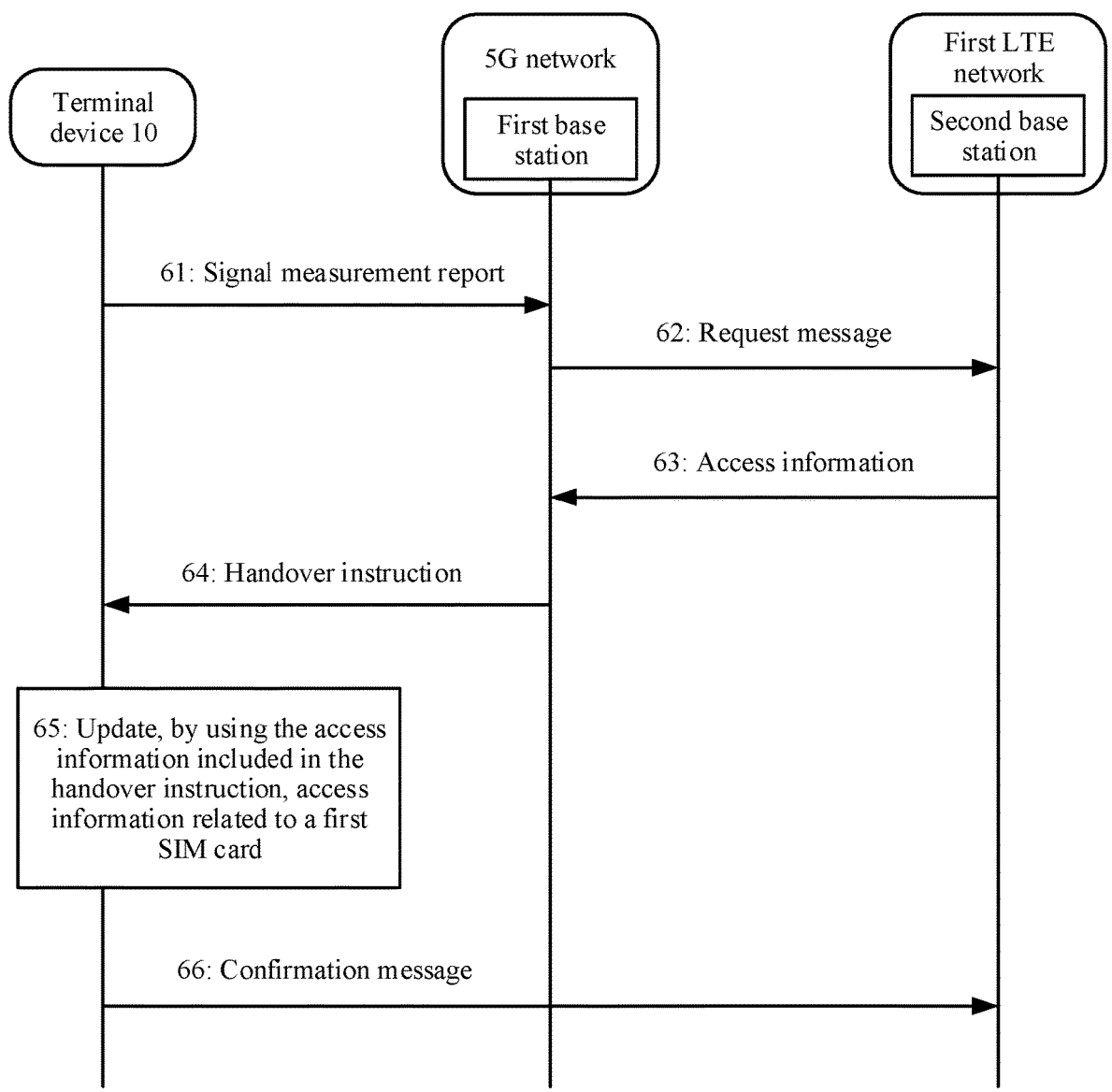
FIG. 6 is another schematic diagram of a process in which a terminal device is disconnected from a 5G network and is connected to a first LTE network according to an embodiment of this application.

Implementation 2: Regardless of whether the first LTE network and the 5G network are standalone, a base station configured to access the terminal device 10 in NR of the 5G network may be connected to a base station configured to access the terminal device 10 in the first LTE network. Correspondingly, as shown in FIG. 6, the following steps 61 to 66 may be performed, so that the terminal device is disconnected from the 5G network, and is connected to the first LTE network by using the first SIM card.

Step 61: The terminal device 10 sends a signal measurement report to a first base station in the 5G network.

The first base station is a base station that establishes an RRC connection to the terminal device 10 in the 5G network.

The signal measurement report is used to indicate that at least signal quality of the first base station relative to the terminal device does not meet a preset condition.

The signal measurement report may further be used to indicate that signal quality of a second base station in the first LTE network relative to the terminal device 10 meets the preset condition.

Step 62: The first base station in the 5G network sends a request message to the second base station in the first LTE network.

The request message is used to request to hand over the terminal device 10 to the second base station in the first LTE network.

It may be understood that the access request may further include related information of the first SIM card, so that when sending a confirmation message to the second base station in a subsequent process, the terminal device learns whether the terminal device 10 that sends the confirmation message is a terminal device 10 allowed to access to the second base station.

Step 63: The second base station in the first LTE network sends access information to the first base station in the 5G network in response to the request message.

The access information includes information required for the terminal device to access the second base station, for example, a related parameter of a dedicated channel allocated by the second base station to the terminal device.

Step 64: The first base station in the 5G network sends a handover instruction to the terminal device 10.

The handover instruction includes the access information.

Step 65: In response to the handover instruction, the terminal device 10 updates, by using the access information included in the handover instruction, access information that is stored in the terminal device 10 and that is related to the first SIM card.

Step 66: The terminal device sends a confirmation message to the second base station of the first LTE network based on the updated access information.

The confirmation message may carry the related information of the first SIM card, so that when receiving the confirmation message, the first LTE network learns that the terminal device is successfully handed over to the second base station, that is, learns that the terminal device completes establishing an RRC connection between the terminal device and the second base station.

In Embodiment 2, the terminal device 10 does not need to contend with another terminal device for a resource of the first LTE network, and may quickly access the first LTE network.

Embodiment 3: The terminal device is disconnected from the 5G network by reselecting a PLMN, and is connected to the first LTE network by using the first SIM card. To be specific, the terminal device actively releases an RRC connection established between the terminal device and the 5G network, and actively requests and completes establishment of an RRC connection between the terminal device and the first LTE network.

Then, in step 33, when the first voice service is related to the first SIM card, the VoLTE-based first voice service is performed through the first LTE network, and a first connection request from a second LTE network is received.

The first voice service may occupy the first radio frequency receive channel RX1 and the first radio frequency transmit channel TX, and the terminal device may receive a connection request from the second LTE network through the second radio frequency receive channel RX2. The connection request is used to request the terminal device 10 to perform a VoLTE-based second voice service, the second voice service is related to the second SIM card, and the connection request may be a paging request or an INVITE message.

Then, in step 35, the first connection request is responded by occupying the radio frequency transmit channel in a time division manner in a process of performing the first voice service.

Specifically, for example, the first voice service is related to the first SIM card, and the first LTE network is a time division duplex (TDD) LTE network. The time division duplex LTE network may have various uplink-downlink configurations shown in the following Table 1.

TABLE 1

| UL-DL Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| UL-DL (0) | 5 ms | D | S | U | U | U | D | S | U | U | U |
| UL-DL (1) | 5 ms | D | S | U | U | D | D | S | U | U | D |
| UL-DL (2) | 5 ms | D | S | U | D | D | D | S | U | D | D |
| UL-DL (3) | 10 ms | D | S | U | U | U | D | D | D | D | D |
| UL-DL (4) | 10 ms | D | S | U | U | D | D | D | D | D | D |
| UL-DL (5) | 10 ms | D | S | U | D | D | D | D | D | D | D |
| UL-DL (6) | 5 ms | D | S | U | U | U | D | S | U | U | D |

As shown in Table 1, the TDD-LTE network may include a plurality of uplink-downlink configurations (UL-DL Configurations). In the seven UL-DL configurations shown in Table 1, uplink-downlink subframe switch-point periodicities of the UL-DL (0), the UL-DL (1), the UL-DL (2), and the UL-DL (6) are 5 ms, and uplink-downlink subframe switch-point periodicities of the UL-DL (3), the UL-DL (4), and the UL-DL (5) are 10 ms. In Table 1, "U" is used to indicate a slot for transmitting uplink data (such as an uplink voice data packet), and "D" is used to indicate a slot for transmitting downlink data.

It can be learned from Table 1 that the uplink data (for example, the uplink voice data packet) is transmitted only within some slots (namely, uplink slots "U") of a subframe, and the uplink data is not transmitted within other slots. For each time period (an idle time period for short) within which the uplink data does not need to be transmitted, within the idle time period, the first voice service related to the first SIM card does not occupy the radio frequency transmit channel TX to transmit the uplink voice data packet.

Correspondingly, in the process in which the terminal device performs the first voice service through the first LTE network, the terminal device may occupy, within an idle time period corresponding to the terminal device, the radio frequency transmit channel TX to respond to the connection request received through the RX2, so that the terminal device 10 receives incoming call information that is from the second LTE network and that is related to the second SIM card.

To ensure call quality of the first voice service, priorities of one or more second data packets that need to be sent by occupying the TX1 when the terminal device 10 performs the first voice service and one or more first data packets that need to be sent by the terminal device 10 for responding to the connection request may further be set. For example, a priority of each second data packet is set to be higher than a priority of the first data packet. In the one or more second data packets, a priority of each voice data packet is higher than a priority of each signaling packet. Based on the priorities, the terminal device 10 sends the data packets by occupying the radio frequency transmit channel TX in the time division manner.

In a possible embodiment, a log (log) of the terminal device 10 may record information about data packets sent and received by the first SIM card and the second SIM card. For example, the log may record types of all uplink data packets related to the first SIM card, a name and a quantity of bytes of the first SIM card, and the like.

Figure 7:
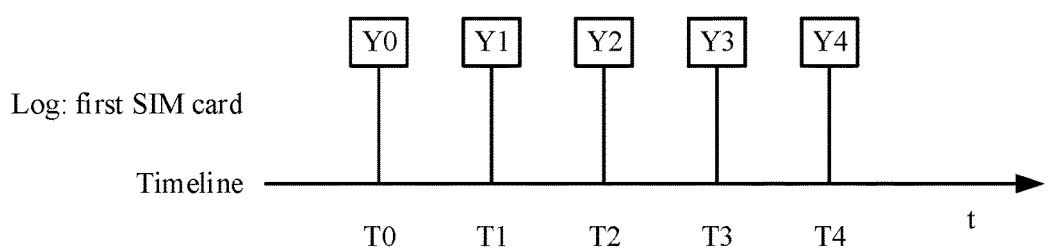
FIG. 7 is a schematic diagram 1 of an example of a log according to an embodiment of the present invention.

FIG. 7 shows an example of information about a data packet sent by the first SIM card recorded in the log according to an embodiment of this application. As shown in FIG. 7, it is assumed that the first SIM card is in a call state (to be specific, the terminal device performs the voice service related to the first SIM card through the first LTE network). The voice data packets related to the first voice service may include a voice data packet Y0, a voice data packet Y1, a voice data packet Y2, a voice data packet Y3, and a voice data packet Y4. The voice data packet Y0, the voice data packet Y1, the voice data packet Y2, the voice data packet Y3, and the voice data packet Y4 are expected to be sequentially sent at a moment T0, a moment T1, a moment T2, a moment T3, and a moment T4.

Still, for example, a priority of the voice data packet related to the first voice service is higher than a priority of each signaling packet that needs to be sent for responding to the connection request. When the terminal device receives the connection request, if there is a to-be-sent voice data packet related to the first voice service in the terminal device, the terminal device may delay responding to the connection request received by the terminal device. Correspondingly, if there is no to-be-sent voice data packet related to the first voice service in the terminal device, the terminal device immediately responds to the connection request received by the terminal device.

Figure 8A:
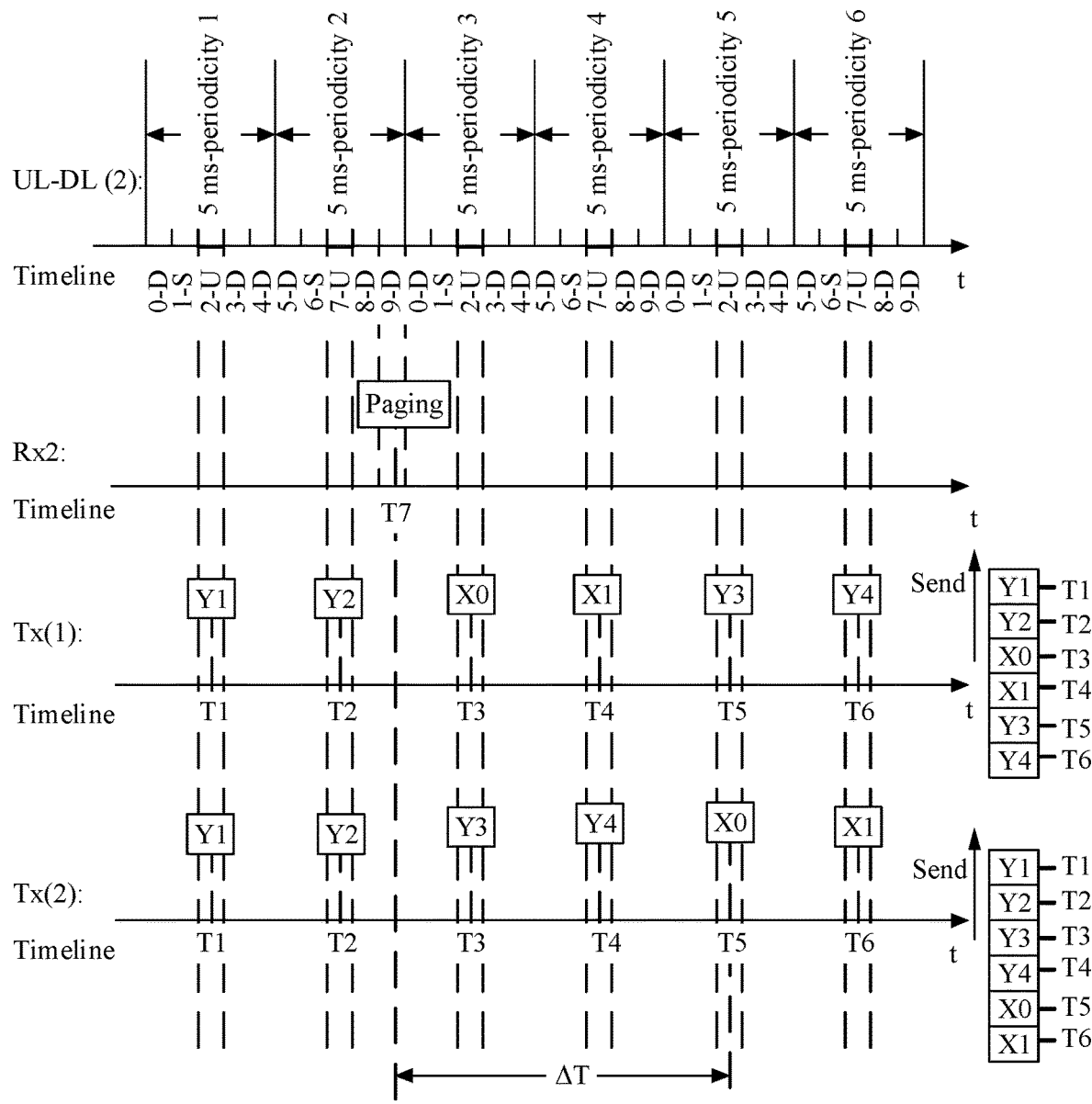
FIG. 8A is a schematic diagram 2 of an example of a log according to an embodiment of the present invention.

With reference to Table 1, it is assumed that the terminal device 10 performs voice services of the first SIM card and the second SIM card in the uplink-downlink configuration manner of the UL-DL (2) shown in Table 1. As shown in FIG. 8A, within a downlink slot "9-D" (namely, a moment T7) of a periodicity 2, the terminal device 10 receives a connection request for the second SIM card on the radio frequency receive channel RX2, for example, a paging request or an INVITE message related to the second SIM card. The following mainly uses the connection request as a paging message.

It should be noted that when the first SIM card is in the call state (to be specific, the terminal device performs the voice service related to the first SIM card), if the connection request received by the terminal device 10 for the second SIM card is the paging request, as shown in FIG. 8A, the terminal device 10 may send a signaling packet X0 and a signaling packet X1 (for example, RRC signaling packets) in response to the paging request.

Generally, regardless of whether the voice data packet of the first SIM card is sent on the TX, after receiving the paging request, the terminal device 10 may immediately respond to the paging request, and send the signaling packet X0 and the signaling packet X1 on the TX. For example, as shown in "Tx(1)" in FIG. 7A, when receiving the paging request for the second SIM card at the moment T7, the terminal device 10 may immediately respond to the paging request, send the signaling packet X0 within a next uplink slot (namely, a slot "2-U" of a periodicity 3, a moment T3), and send the signaling packet X1 within a next uplink slot (namely, a slot "7-U" of a periodicity 4, a moment T4).

Subsequently, the terminal device 10 may send the voice data packet Y3 within a slot "2-U" (namely, a moment T5) of a periodicity 5, and send the voice data packet Y4 within a slot "7-U" (namely, a moment T6) of a periodicity 6. To be specific, the terminal device 10 may occupy the TX to sequentially send the voice data packet Y0, the voice data packet Y1, the voice data packet Y2, the signaling packet X0, the signaling packet X1, the voice data packet Y3, and the voice data packet Y4 at a moment T0, a moment T1, a moment T2, the moment T3, the moment T4, the moment T5, and the moment T6.

However, when the first SIM card is in the call state, if the terminal device 10 receives the paging request for the second SIM card, the terminal device 10 immediately responds to the paging request, and occupies the TX to send the signaling packet X0 and the signaling packet X1 to the second LTE network, the voice data packet of the first SIM card may be sent with a delay. This affects voice communication quality of the first SIM card.

To ensure the voice communication quality of the first SIM card, in a possible embodiment, when sending the voice data packet (namely, a voice data packet that needs to be sent in a process in which the terminal device performs the first voice service) of the first SIM card, the terminal device 10 may delay responding to the paging request. For example, as shown in "Tx(2)" in FIG. 8A, when receiving a paging request for the first SIM card at the moment T7, a terminal may delay responding to the paging request. As shown in "Tx(2)" in FIG. 8A, the terminal device 10 may send the voice data packet Y3 within a next uplink slot (namely, the slot "2-U" of the periodicity 3, the moment T3), and send the voice data packet Y4 within a next uplink slot (namely, the slot "7-U" of the periodicity 4, the moment T4). Subsequently, the terminal device 10 may send the signaling packet X0 within the slot "2-U" (namely, the moment T5, which is delayed ΔT compared with the moment T7) of the periodicity 5, and send the signaling packet X1 within the slot "7-U" (namely, the moment T6) of the periodicity 6. To be specific, the terminal device 10 may occupy the TX to sequentially send the voice data packet Y0, the voice data packet Y1, the voice data packet Y2, the voice data packet Y3, the voice data packet Y4, the signaling packet X0, and the signaling packet X1 at the moment T0, the moment T1, the moment T2, the moment T4, the moment T5, and the moment T6.

In another possible embodiment, it is assumed that the terminal device 10 performs voice communication related to the first SIM card in the UL-DL (2) uplink-downlink configuration manner shown in Table 1, and performs voice communication related to the second SIM card in the uplink-downlink configuration manner of the UL-DL (1) shown in Table 1.

Figure 8B:
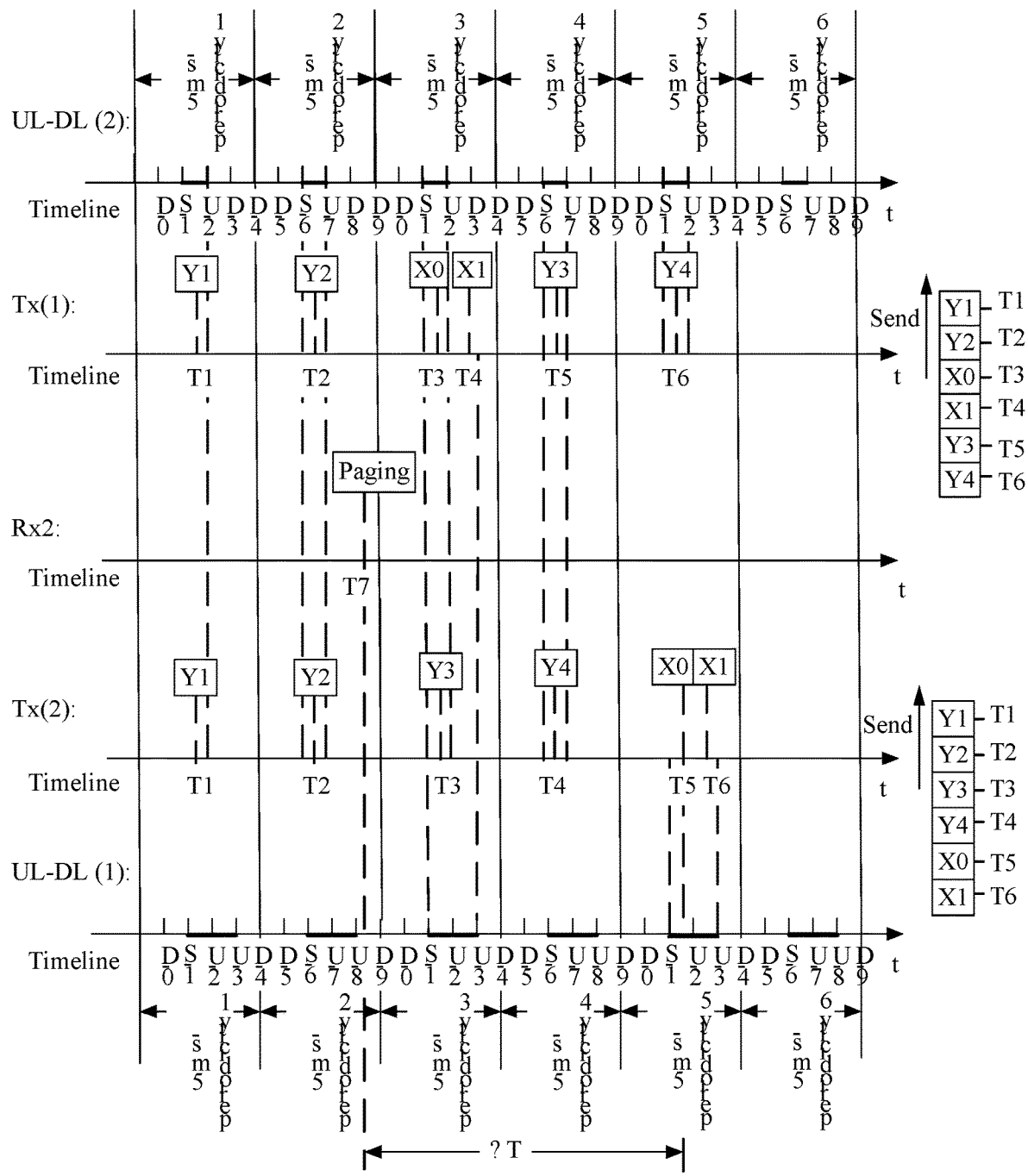
FIG. 8B is a schematic diagram 3 of an example of a log according to an embodiment of the present invention.

Generally, regardless of whether the voice data packet of the SIM card 1 is sent on the radio frequency TX channel, after receiving the foregoing connection request (for example, the paging request), the terminal 110 may immediately respond to the paging request, and send the signaling packet X0 and the signaling packet X1 on the TX channel. For example, as shown in FIG. 8B, within a downlink slot "9-D" (namely, a moment T7) of a periodicity 2 of the UL-DL (1), the terminal device 10 receives a paging request for the second SIM card from the second LTE network through the RX2. When receiving the paging request for the second SIM card at the moment T7, the terminal may immediately respond to the paging request, send the signaling packet X0 within a slot "2-U" (namely, a moment T3) of a periodicity 3 of the UL-DL (1), and send the signaling packet X1 within a slot "3-U" (namely, a moment T4) of the periodicity 3 of the UL-DL (1). Subsequently, the terminal 110 may send the voice data packet Y3 within a slot "7-U" (namely, a moment T5) of a periodicity 4 of the UL-DL (2), and send the voice data packet Y4 within a slot "2-U" (namely, a moment T6) of a periodicity 5 of the UL-DL (2).

However, when the first SIM card is in the call state, if the terminal device 10 receives the paging request for the second SIM card, the terminal device 10 immediately responds to the paging request, and occupies the TX to send the signaling packet X0 and the signaling packet X1 to the second LTE network, the voice data packet of the first SIM card is sent with a delay. This affects the voice communication quality of the first SIM card.

To ensure the voice communication quality of the first SIM card, in another possible embodiment, when sending the voice data packet of the first SIM card (to be specific, there is a to-be-sent voice data packet related to the first voice service in the terminal device 10), the terminal device 10 may delay responding to the paging request. For example, as shown in "Tx(2)" in FIG. 8B, when receiving the paging request for the second SIM card at the moment T7, the terminal device 10 may delay responding to the paging request, send the voice data packet Y3 within a slot "2-U" of a periodicity 3 of the UL-DL (2), and send the voice data packet Y4 within a slot "7-U" (namely, a moment T4) of a periodicity 4 of the UL-DL (2). Subsequently, the terminal 110 may send the signaling packet X0 within a slot "2-U" (namely, a moment T5, which is delayed ΔT compared with the moment T7) of a periodicity 5 of the UL-DL (1), and send the signaling packet X1 within a slot "3-U" (namely, a moment T6) of the periodicity 5 of the UL-DL (1).

Figure 9A:
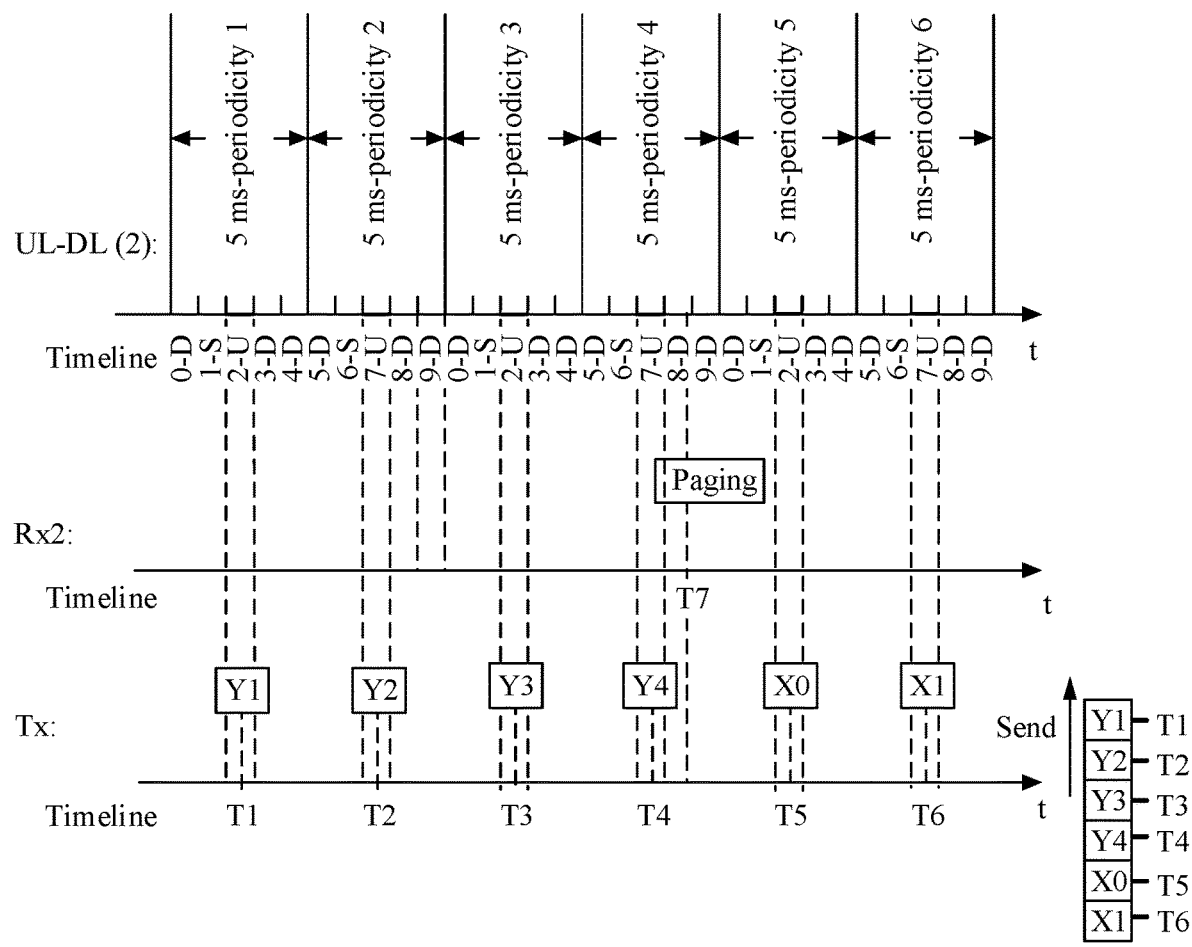
FIG. 9A is a schematic diagram 4 of an example of a log according to an embodiment of the present invention.

For example, with reference to Table 1, it is assumed that the terminal performs voice communication (namely, the voice services) of the first SIM card and the second SIM card in the uplink-downlink configuration manner of the UL-DL (2) shown in Table 1. As shown in FIG. 9A, within a downlink slot "9-D" (namely, a moment T7) of a periodicity 2, the terminal device 10 receives the paging request (namely, the connection request used to request the terminal device to perform the second voice service related to the second SIM card) for the second SIM card from the second LTE network through the RX2. In this case, there is no to-be-sent voice data packet related to the first voice service in the terminal device 10. In this case, when receiving the paging request, the terminal device 10 may immediately respond to the paging request, and send the signaling packet X0 and the signaling packet X1 on the TX channel. For example, as shown in FIG. 9A, after receiving the paging request for the second SIM card at the moment T7, the terminal may immediately respond to the paging request, send the signaling packet X0 within a next uplink slot (namely, a slot "2-U" of a periodicity 5, a moment T5), and send the signaling packet X1 within a next uplink slot (namely, a slot "7-U" of a periodicity 6, a moment T6).

Figure 9B:
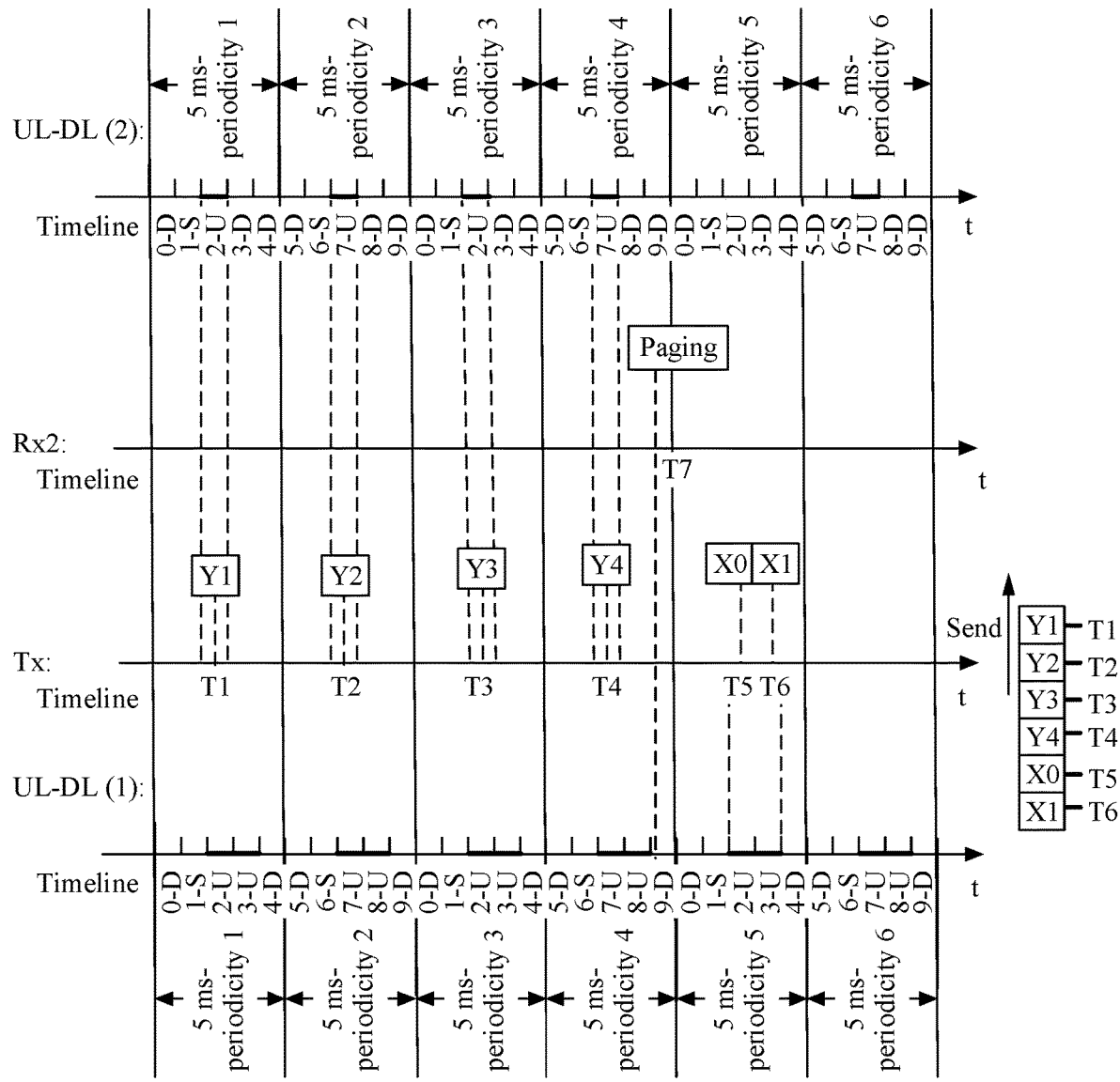
FIG. 9B is a schematic diagram 5 of an example of a log according to an embodiment of the present invention.

For example, it is assumed that the terminal performs the voice service related to the first SIM card in the manner of the uplink-downlink configuration UL-DL (2) shown in Table 1, and performs the voice service related to the second SIM card in the uplink-downlink configuration manner of the UL-DL (1) shown in Table 1. As shown in FIG. 9B, when receiving the paging request for the second SIM card at a moment T7, the terminal device 10 may immediately respond to the paging request, send the signaling packet X0 within a slot "2-U" (namely, a moment T5) of a periodicity 5 of the UL-DL (1), and send the signaling packet X1 within a slot "3-U" (namely, a moment T6) of the periodicity 5 of the UL-DL (1).

In a possible embodiment, the terminal device may have a capability of continuously measuring signal quality of the 5G network. To avoid a case that after the terminal device 10 is connected to the first LTE network by using the first SIM card, the terminal device 10 is reconnected to the 5G network by using the first SIM card because the signal quality of the 5G network is better than signal quality of the first LTE network, and the terminal device 10 may stop measuring the signal quality of the 5G network after the terminal device 10 accesses the first LTE network.

As described above, the first voice service may be the voice service that is actively initiated by the terminal device under the operation of the user and that is related to the first SIM card or the second SIM card, or the first voice service may be a voice service that is initiated by another terminal device and that is related to the first SIM card or the second SIM card. The following provides example description for the voice service in the foregoing one or more initiation manners and the communication method provided in the embodiments of this application.

Figure 10A:
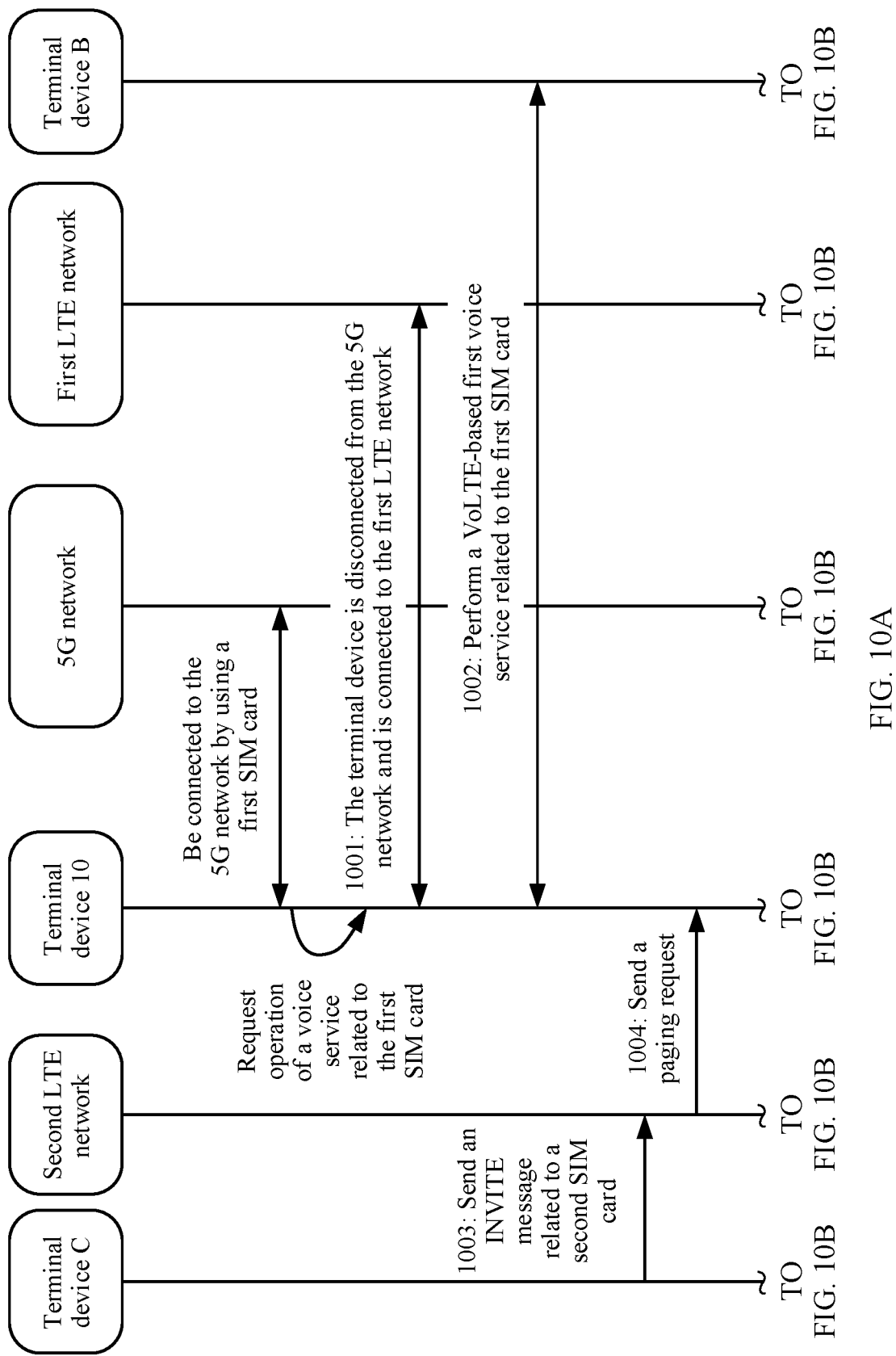

For example, a terminal device 10 actively initiates, under an operation of a user, a first voice service related to a first SIM card to a terminal device B, and receives, in a process in which the terminal device 10 performs a voice call with the terminal device B by using the first SIM card, incoming call information corresponding to a second voice service that is initiated by a terminal device C to the terminal device 10 and that is related to a second SIM card. As shown in FIG. 10A and FIG. 10B, the communication method according to the embodiments of this application may include some or all of the following steps 1001 to 1009.

Step 1001: In response to a request operation of the user that is related to the first SIM card and that is used to request to perform the first voice service with the terminal device B, the terminal device 10 is disconnected from a 5G network and accesses a first LTE network by using the first SIM card.

Specifically, the request operation may be an operation that is generated by the user performing a corresponding operation on a mobile phone and that is of dialing a phone number corresponding to one SIM card installed on the terminal device B.

Step 1002: The terminal device 10 performs the VoLTE-based first voice service related to the first SIM card with the terminal device B through the first LTE network.

The first voice service occupies a first radio frequency receive channel and a radio frequency transmit channel of the terminal device 10.

It should be noted that, before step 1002, a similar information exchange process that includes but is not limit to subsequent steps 1005 to 1009 may further be performed between the terminal device 10 and the first LTE network.

Step 1003: The terminal device C sends an INVITE message related to the second SIM card to a second LTE network.

Step 1004: The second LTE network sends, in response to the INVITE, a paging request related to the second SIM card to the terminal device B.

The paging request is used to request the terminal device 10 to perform a VoLTE-based second voice service related to the second SIM card with the terminal device C.

Step 1005: The terminal device 10 exchanges, in response to the paging request, RRC signaling with the second LTE network by using the second SIM card.

Herein, a process in which the terminal device 10 exchanges the RRC signaling with the second LTE network by using the second SIM card may be considered as a process in which the terminal device accesses the second LTE network by using the second SIM card. In other words, after the terminal device 10 completes exchanging the RRC signaling with the second LTE network, the terminal device 10 accesses the second LTE network by using the second SIM card.

Herein, the terminal device 10 accesses the first LTE network by using the first SIM card, and in a process in which the terminal device 10 responds to the paging message, a receive end (namely, the second LTE network) of a signaling packet (for example, an RRC signaling packet or response information) that needs to be sent also meets an LTE network standard. Therefore, one or more first data packets sent by the terminal device 10 for responding to the paging message and one or more second data packets sent by the terminal device 10 for performing the first voice service may occupy the radio frequency transmit channel of the terminal device 10 in a time division manner.

It may be understood that steps 1005 to 1007 are a specific process in which the terminal device 10 responds to the paging related to the second SIM card. In the entire response process, one or more signaling packets need to be sent, and one or more signaling packets may also be received. The "paging request" related to the second SIM card may be considered as a connection request used to request the terminal device 10 to perform the VoLTE-based second voice service with the terminal device C by using the second SIM card.

Step 1006: The second LTE network sends an INVITE message to the terminal device 10.

It should be noted that a network device (which may be a proxy server located in the second LTE network) in the second LTE network may insert an address (for example, an IP address) of the network device into the INVITE message sent by the terminal device C, and send the INVITE message into which the address is inserted to the terminal device 10, so that the response information sent by the terminal device can reach the network device in the second LTE network.

Step 1007: The terminal device 10 sends the response information to the second LTE network.

Step 1008: The second LTE network sends the incoming call information related to the second voice service to the terminal device 10.

For example, the terminal device C accesses the second LTE network by using one SIM card installed on the terminal device C. The network device (for example, a proxy server) in the second LTE network may maintain related information of the SIM card, for example, information such as a phone number and a registration location corresponding to the SIM card. The information may be sent to the terminal device 10 as the incoming call information related to the second voice service.

Step 1009: The terminal device 10 performs an incoming call notification in response to the incoming call information.

Usually, the terminal device 10 may ring after sending the response information, and receive the incoming call information from the second LTE network after ringing once.

Figure 11A:
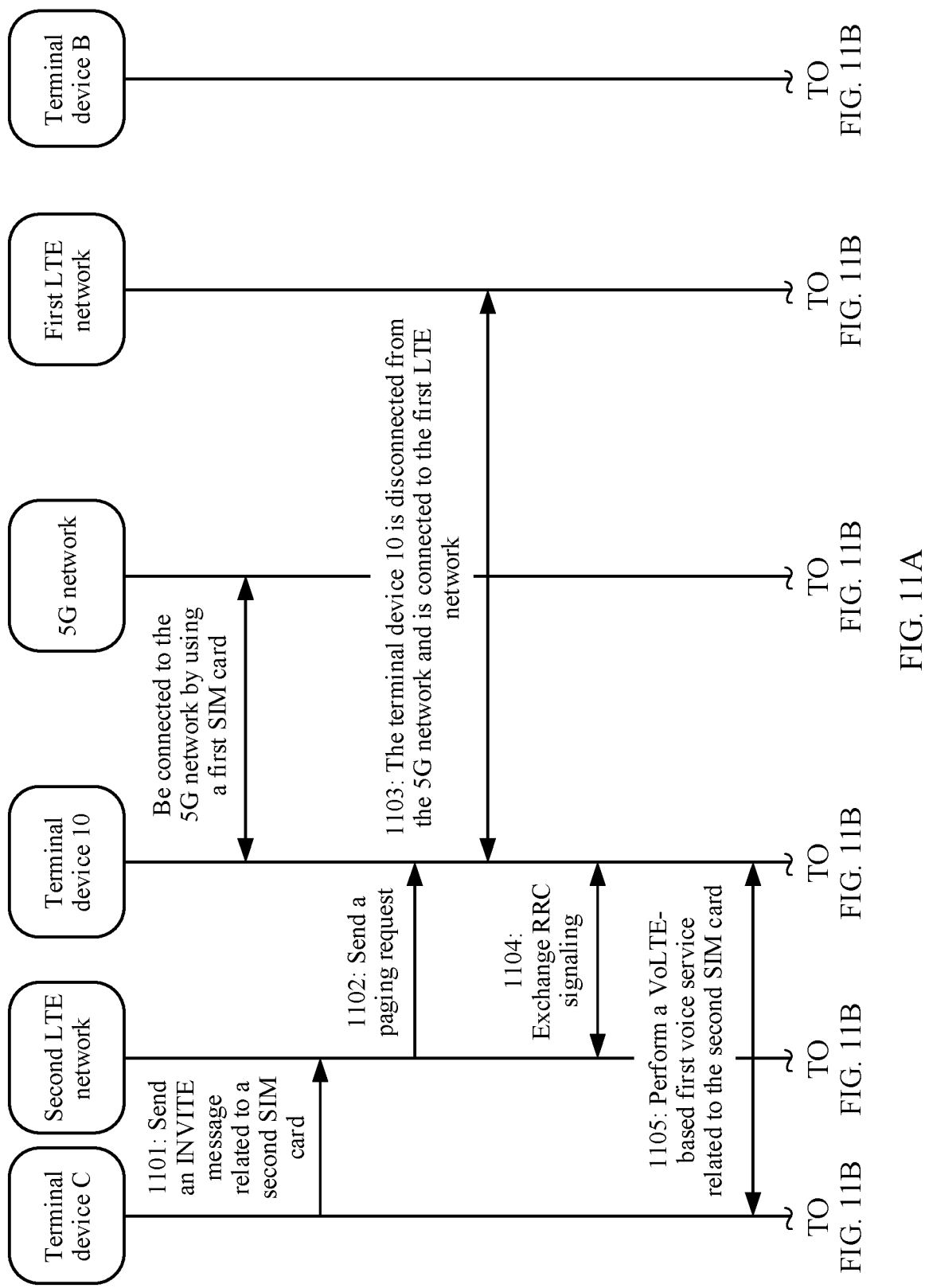
FIG. 11A and FIG. 11B are a schematic diagram of a process in which a terminal device performs an incoming call notification for a second voice service in a process of performing a first voice service according to an embodiment of this application.
Figure 11B:
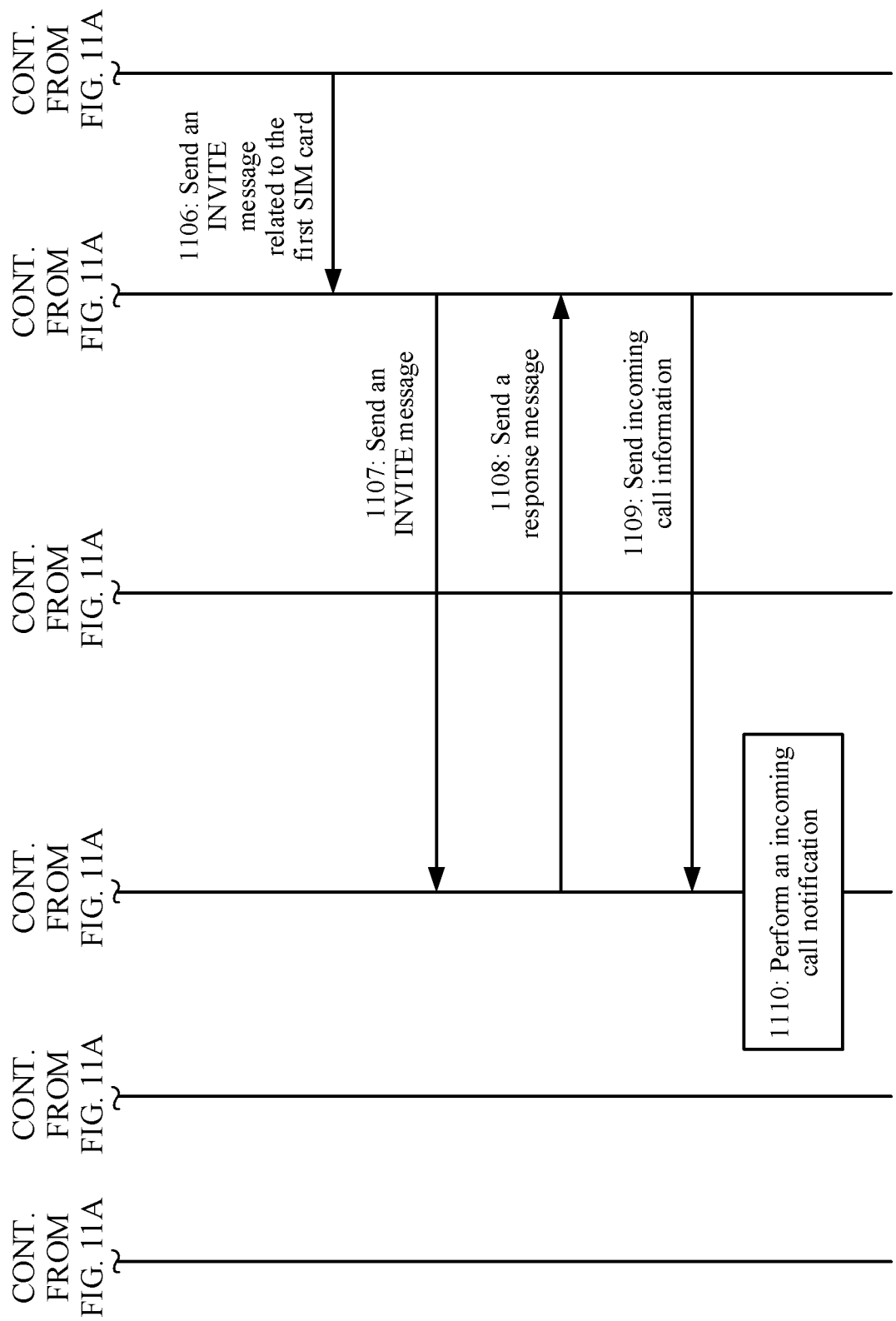

For example, a first voice service is a voice service that is initiated by a terminal device C and that is related to a second SIM card, and a terminal device 10 receives incoming call information corresponding to a second voice service that is initiated by a terminal device B to the terminal device 10 and that is related to a first SIM card in a process of performing a voice call with the terminal device C by using the second SIM card. As shown in FIG. 11A and FIG. 11B, the communication method according to the embodiments of this application may include some or all of the following steps 1101 to 1110.

Step 1101: The terminal device C sends an INVITE message related to the second SIM card to a second LTE network.

The INVITE message is used to request the terminal device 10 to perform the VoLTE-based first voice service with the terminal device C by using the second SIM card installed on the terminal device 10.

Step 1102: The second LTE network sends, in response to the received INVITE message, a paging request related to the second SIM card to the terminal device 10.

Step 1103: The terminal device 10 is disconnected from a 5G network and is connected to a first LTE network.

Step 1104: The terminal device 10 exchanges RRC signaling with the second LTE network, so that the terminal device 10 accesses the second LTE network by using the second SIM card.

Step 1105: The terminal device performs the VoLTE-based first voice service related to the second SIM card with the terminal device C through the second LTE network.

The first voice service occupies a first radio frequency receive channel and a radio frequency transmit channel of the terminal device 10.

It should be noted that, before step 1105, in addition to exchanging the RRC signaling with the second LTE, the terminal device 10 may further need to exchange data with the second LTE network for one or more times, including but not limited to performing an information exchange process similar to subsequent steps 1107 to 1110.

Step 1106: The terminal device B sends an INVITE message related to the first SIM card to the first LTE network.

The INVITE message is used to request the terminal device 10 to perform the VoLTE-based second voice service with the terminal device B by using the first SIM card installed on the terminal device 10.

Step 1107: The first LTE network sends an INVITE message to the terminal device 10.

It may be understood that the "INVITE message" related to the first SIM card may be considered as a connection request used to request the terminal device 10 to perform the VoLTE-based second voice service with the terminal device B by using the first SIM card.

It should be noted that a network device (which may be a proxy server located in the first LTE network) in the first LTE network may insert an address (for example, an IP address) of the network device into the INVITE message sent by the terminal device B, and send the INVITE message into which the address is inserted to the terminal device 10, so that response information sent by the terminal device can reach the network device in the first LTE network.

Step 1108: The terminal device 10 responds to the INVITE message received by the terminal device 10, and sends response information to the first LTE network.

Herein, the terminal device 10 accesses the first LTE network by using the first SIM card, and in a process in which the terminal device 10 responds to a paging message, a receive end (namely, the first LTE network) of a data packet (for example, the response information) that needs to be sent also meets an LTE network standard. Therefore, one or more first data packets sent by the terminal device 10 for responding to the INVITE message and one or more second data packets sent by the terminal device 10 for performing the first voice service may occupy the radio frequency transmit channel of the terminal device 10 in a time division manner.

Step 1109: The first LTE network sends the incoming call information to the terminal device 10.

Step 1110: The terminal device 10 performs an incoming call notification in response to the incoming call information.

Usually, the terminal device 10 may ring after sending the response information, and receive the incoming call information from the first LTE network after ringing once.

In the foregoing examples, the incoming call notification is implemented in a manner, including but not limited to, of displaying the incoming call information on a corresponding interface. In addition to the incoming call information, call duration within which the terminal device performs the first voice service, a hang-up icon related to the first voice service, an answer icon related to the second voice service, and the like may further be displayed on the interface used to display the incoming call information.

Correspondingly, the user may further perform a corresponding operation on the interface used to display the incoming call information, to select whether to perform the second voice service. The example in which the first voice service is related to the first SIM card and the second voice service is related to the second SIM card is still used. The user may terminate or perform the first voice service by triggering the hang-up icon or the answer icon. In addition, when the user selects to trigger the answer icon, the terminal device may send, through the second LTE network, response information indicating connection success. When the terminal device receives an ACK packet from the second LTE network, the terminal device may perform the VoLTE-based second voice service related to the second SIM card through the second LTE network.

It may be understood that, for each icon included on the interface used to display the incoming call information and a response performed by the terminal device by triggering each icon on the interface by the user, refer to the conventional technology. Processing processes that may occur after the terminal device receives the incoming call information related to the second voice service and that are relative to the first voice service and the second voice service are not described herein again.

In a possible embodiment, before receiving the connection request used to request the terminal device to perform the second voice service related to the other SIM card, regardless of performing the VoLTE-based first voice service, the NR-based first voice service or the first voice services in other various forms, the terminal device may not be disconnected from the 5G network and may be connected to the first LTE network. The terminal device is disconnected from the 5G network and is connected to the first LTE network by using the first SIM card only after receiving the connection request used to request the terminal device to perform the second voice service related to the another SIM card.

In the foregoing embodiments, the terminal device is disconnected from the 5G network when performing the voice service related to the first SIM card, so that in the process in which the terminal device performs the first voice service, the 5G dedicated channels RXn and TXn are idle. If the terminal device performs the data service at the same time in the process of performing the voice service, when performing the data service, the terminal device may need to transmit a large quantity of service data packets and signaling packets related to the data service. Correspondingly, when the terminal device concurrently performs the data service and the voice service, some data packets that need to be transmitted through the radio frequency transmit channel TX of the primary channels may not be transmitted to a network side in a timely manner. Therefore, the terminal device cannot respond to the connection request in the timely manner, communication quality of the first voice service is affected, or the data service cannot be efficiently performed. This affects user experience.

Figure 12:
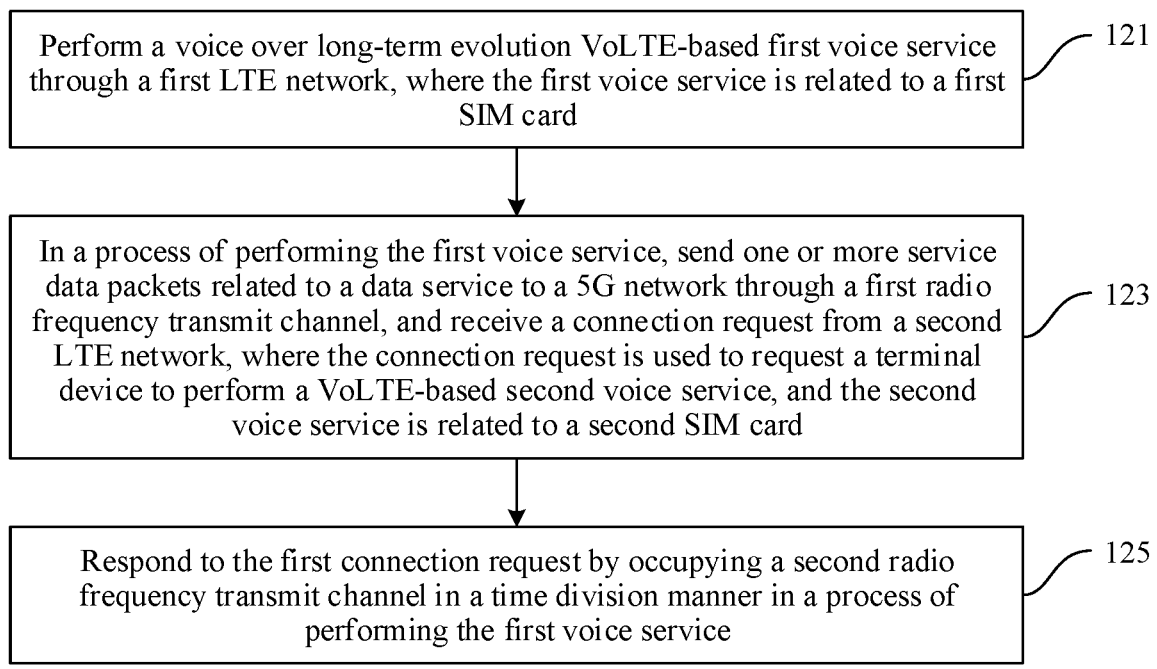
FIG. 12 is a flowchart of another communication method performed by a terminal device according to an embodiment of this application.

To further improve user experience, an embodiment of this application further provides another communication method. The communication method may be applied to the terminal device 10 shown in FIG. 1 and FIG. 2. The terminal device 10 includes a first radio frequency transmit channel TXn, a second radio frequency transmit channel TX, a first SIM card interface 103, and a second SIM card interface 104. The first SIM card interface 103 is configured to communicate with a first SIM card, and the second SIM card interface 104 is configured to communicate with a second SIM card. The terminal device 10 is connected to a 5G network and a first LTE network by using the first SIM card. As shown in FIG. 12, the communication method may include at least the following steps 121, 123, and 125.

Step 121: Perform a VoLTE-based first voice service through the first LTE network, where the first voice service is related to the first SIM card.

As described above, networking modes of the 5G network and the first LTE network may be non-standalone. When the 5G network and the first LTE network are non-standalone, the terminal device may be connected to both the first LTE network and the 5G network by using the first SIM card installed on the terminal device.

In a possible embodiment, when another device requests the terminal device 10 to perform the first voice service related to the first SIM card, if the connection request comes from the first LTE network, the terminal device 10 responds to the connection request. If the connection request is from the 5G network, the terminal device 10 may not need to respond to the connection request.

In another possible embodiment, the terminal device sends the connection request to the first LTE network in response to a request operation of a user for the first voice service.

In this way, the terminal device can perform, through the first LTE network, a VoLTE-based voice service related to the first SIM card.

It may be understood that, when the terminal device 10 performs the first voice service, each voice data packet and a signaling packet related to the first voice service that need to be sent for performing the first voice service may be sent to the first LTE network through the second radio frequency transmit channel TX, and each voice data packet and a signaling packet related to the first voice service that need to be received for performing the first voice service may be received from the first LTE network through a first radio frequency receive channel RX1.

Step 123: In a process of performing the first voice service, send one or more service data packets related to a data service to the 5G network through the first radio frequency transmit channel, and receive a connection request from a second LTE network. The connection request is used to request the terminal device to perform a VoLTE-based second voice service, and the second voice service is related to the second SIM card.

It may be understood that, when performing the data service, the terminal device not only may need to send the service data packet to the 5G network through the first radio frequency transmit channel, but also may need to send a signaling packet related to the data service to the 5G network through the first radio frequency transmit channel.

It may be understood that, when performing the data service, the terminal device may further receive a service data packet and a signaling packet that are related to the data service from the 5G network through a third radio frequency receive channel RXn.

Step 125: Respond to the first connection request by occupying the second radio frequency transmit channel in a time division manner in a process of performing the first voice service.

As described above, the terminal device performs, in the first LTE network supporting an LTE network standard, the first voice service related to the first SIM, and the connection request is used to request the terminal device to perform, in the second LTE network supporting the LTE network standard, the second voice service related to the second SIM card. Therefore, step 125 may be implemented herein by using the technical solution that is provided in any one of the foregoing embodiments and in which the connection request is responded, by occupying the radio frequency transmit channel in the time division manner, in a process of performing the first voice service.

In the foregoing embodiment, in a process of performing a voice service related to one SIM card, the terminal device may respond to a connection request used to request the terminal device to perform a voice service related to the other SIM card. In addition, in a process of concurrently performing the voice service and a data service, the terminal device may separately transmit, through different radio frequency transmit channels, a data packet related to the voice service and a service data packet related to the data service to two different networks. In this way, each data packet that needs to be sent by the terminal device can be transmitted to a network side more quickly, to further improving user experience.

A quantity of the data packets that need to be sent by the terminal device for performing the data service may be relatively large, and a quantity of the data packets that need to be sent by the terminal device for performing the voice service is relatively small. Therefore, in a possible embodiment, the terminal device may further send, to the first LTE network by occupying the second radio frequency transmit channel TX in the time division manner, one or more data packets related to the data service performed by the terminal device. In this way, the terminal device can quickly transmit a large quantity of the service data packets related to the data service to the network side, to further improve user experience.

It may be understood that because the first LTE network and the 5G network are non-standalone, in a process in which the terminal device performs the data service, service data transmitted to the first LTE network and service data transmitted to the 5G network may reach a same core network, and then are forwarded to corresponding networks or devices.

For example, when the 5G network and the first LTE network (for ease of description, the first LTE network is referred to as a 4G network in the following examples) are non-standalone, when the terminal device does not perform a voice call related to the first SIM card (for ease of description, the first SIM card is referred to as a card 1 in the following examples) or the second SIM card (for ease of description, the second SIM card is referred to as a card 2 in the following examples), a network status of the terminal device at a current moment may be displayed, to the user, in a signal status bar of a graphical user interface (GUI) displayed by the terminal device. For example, as shown in FIG. 13A1 or FIG. 13A2, a signal status bar in the upper right corner in a GUI may prompt the user that the terminal device 10 is connected to both the 5G network and a 4G network by using the card 1, and the terminal device 10 is connected to the other 4G network by using the card 2.

Figure 13B:
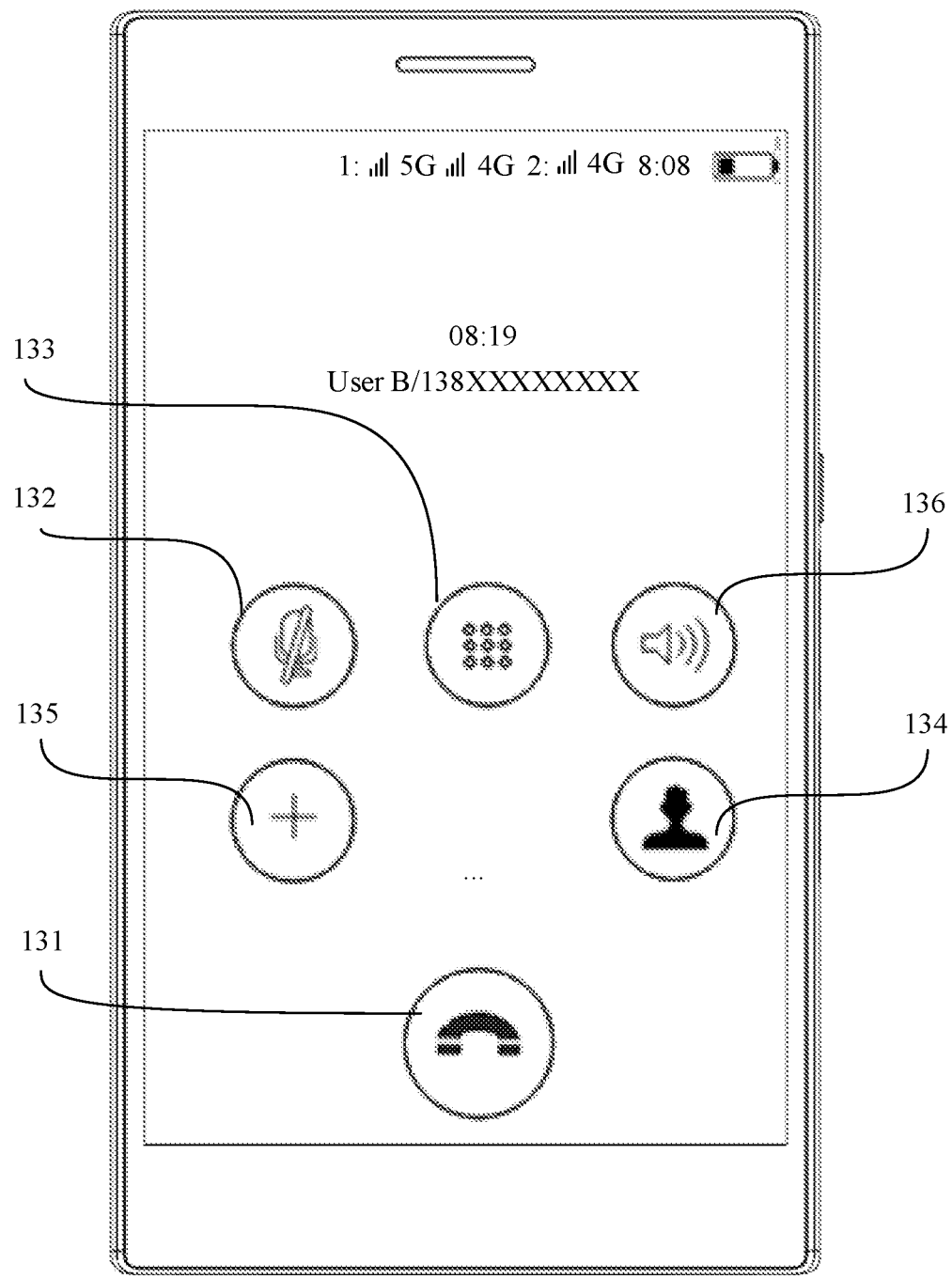
FIG. 13B is a graphical user interface 3 that may be displayed when a terminal device according to an embodiment of this application performs a communication method according to an embodiment of this application.

It should be noted that, when the terminal device is connected to both the 4G network and the 5G network by using the card 1, if the terminal device is configured to preferentially perform the data service through the 5G network, in a process in which a voice service is not performed, the terminal device usually uses characters and a pattern that are displayed in the network status bar in the graphical user interface shown in FIG. 13A to indicate that the terminal device 10 is connected to both the 5G network and the 4G network by using the card 1, and the terminal device 10 is connected to the other 4G network by using the card 2. Only in a process of performing a voice call related to the card 1, the terminal device indicates, by using characters and a pattern that are displayed in a network status bar in a graphical user interface shown in FIG. 13B, that the voice call that is performed by the user and that is related to the card 1 is a voice call that is related to the card 1 and that is performed through the 4G network.

For example, the terminal device 10 may perform, under an operation of the user, the data service in the 5G network by using the card 1, and perform, by using the card 1, a VoLTE-based voice call with a terminal device held by another user in a 4G network connected to terminal device 10. For example, when the terminal device 10 performs a voice call with a terminal device B held by a user B, the terminal device 10 may display the graphical user interface shown in FIG. 13B. Incoming call information and a call status of the terminal device 10 may be displayed on the graphical user interface. For example, a SIM card used for an ongoing voice call being the card 1, an object of the voice call being the user B, a phone number used by the user object B, duration of the voice call, and the like are displayed. One or more function icons that are used to receive the operation of the user to manage the voice call may further be displayed on the graphical user interface. Specifically, for example, a hang-up icon 131, a mute icon 132, a dial pad icon 133, an address book icon 134, a call adding icon 135, and a speaker icon 136 are displayed. For a processing process correspondingly performed by the terminal device in response to the user triggering each icon, refer to the conventional technology. Details are not described herein again.

Figure 13C:
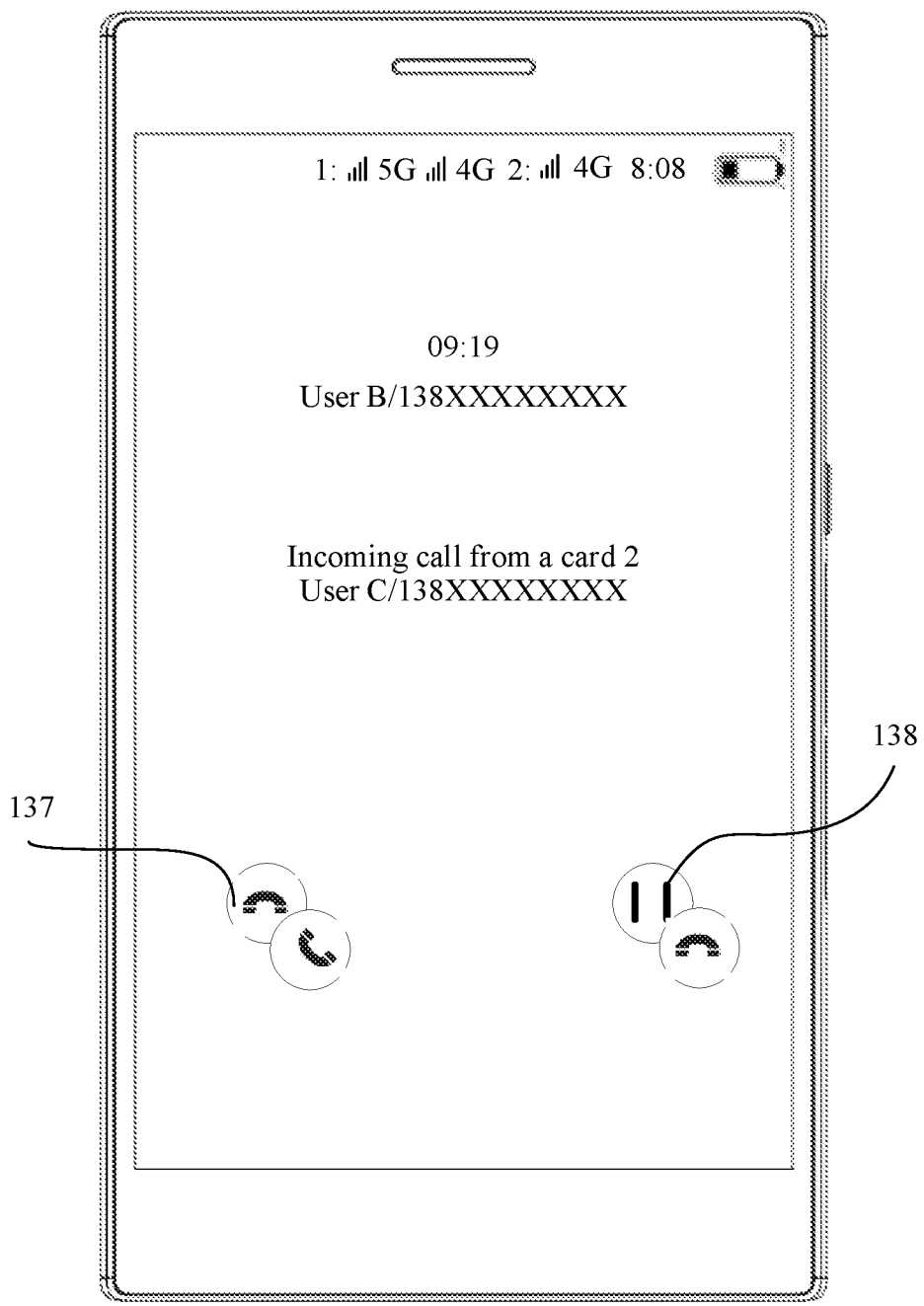
FIG. 13C is a graphical user interface 4 that may be displayed when a terminal device according to an embodiment of this application performs a communication method according to an embodiment of this application.

When performing the voice call by using the card 1, the terminal device 10 is not disconnected from the 5G network, and a graphical user interface shown in FIG. 13C prompts the user that the terminal device 10 remains connected to the 5G network. Correspondingly, in a process of performing the voice call by using the card 1, the terminal device 10 may still perform the data service through the 5G network. For example, in a process of performing voice communication by using the card 1, the terminal device automatically downloads and updates, through the 5G network, a data packet used to update one or more applications, automatically synchronizes personal data stored in the terminal device to a cloud platform, and the like.

As described above, if the user triggers the hang-up icon 131 to hang up a voice call that is being performed by the user and that is related to the card 1, the characters and the pattern that are displayed in the network status bar in the graphical user interface shown in FIG. 13A may be displayed in a network status bar in the graphical user interface displayed by the terminal device.

Then, with reference to the foregoing embodiments, it can be learned that, in the process of performing voice communication by using the card 1, the terminal device may receive an incoming call from another user (for example, a user C). In this case, the terminal device may display incoming call information of the user C by using a corresponding graphical user interface. For example, the terminal device 10 may display a graphical user interface shown in FIG. 13C. The user may trigger a hang-up and answer icon 137 on the interface shown in FIG. 13C, to hang up the ongoing voice call related to the card 1 and answer an incoming call from the card 2. The user may trigger a continuing and hang-up icon 138 on the interface shown in FIG. 13C for hanging up, so that the terminal device 10 hangs up the incoming call related to the card 2 and continues the voice call related to the card 1.

Figure 14:
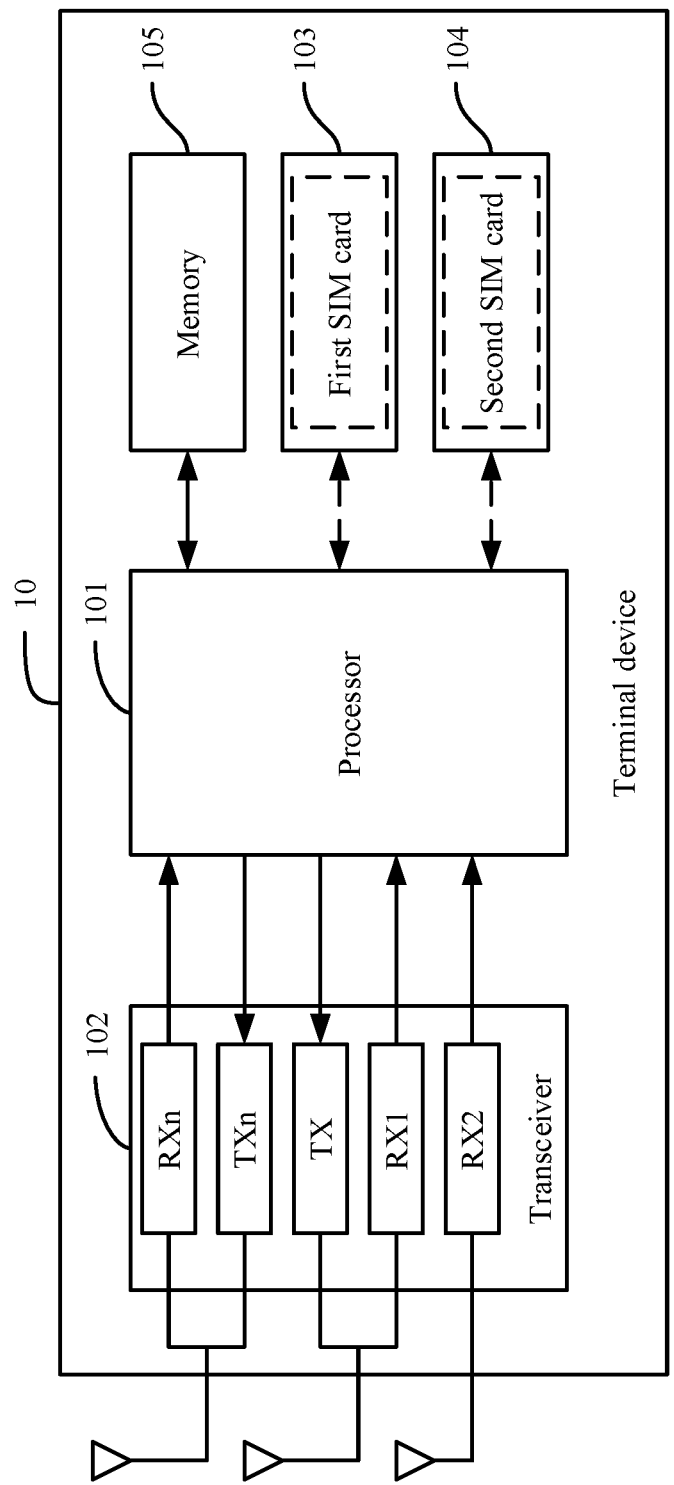
FIG. 14 is a schematic diagram of a structure of another terminal device according to an embodiment of this application.

Based on a same concept as the foregoing method embodiments, an embodiment of this application further provides a terminal device 10. As shown in FIG. 14, the terminal device 10 includes a processor 101 and a transceiver 102. The transceiver 102 includes a first radio frequency receive channel RX1, a second radio frequency receive channel RX2, a second radio frequency transmit channel TX, a first radio frequency transmit channel TXn, and a third radio frequency receive channel RXn. The terminal device 10 further includes a first SIM card interface 103 and a second SIM card interface 104. The first SIM card interface 103 is configured to communicate with a first SIM card, and the second SIM card interface 104 is configured to communicate with a second SIM card. The terminal device 10 is connected to a 5G network and a first long-term evolution LTE network by using the first SIM card, and the terminal device 10 further includes a processor 101. The processor 101 is configured to perform at least the following operations:

disconnecting the terminal device 10 from the 5G network and connecting the terminal device to the first LTE network by using the first SIM card when the terminal device 10 needs to perform a first voice service;

when the first voice service is related to the first SIM card, performing the VoLTE-based first voice service through the first LTE network, and receiving a first connection request from a second LTE network, where the first connection request is used to request the terminal device to perform a VoLTE-based second voice service, and the second voice service is related to the second SIM card; and responding to the first connection request by occupying the radio frequency transmit channel in a time division manner in a process of performing the first voice service.

In a possible embodiment, the processor 101 is further configured to:

perform the voice over long-term evolution VoLTE-based first voice service through the first LTE network, where the first voice service is related to the first SIM card;

in a process of performing the first voice service, send one or more service data packets related to a data service to the 5G network through the first radio frequency transmit channel, and receive the connection request from the second LTE network, where the connection request is used to request the terminal device to perform the VoLTE-based second voice service, and the second voice service is related to the second SIM card; and respond to the connection request by occupying the second radio frequency transmit channel in the time division manner in the process of performing the first voice service.

In a possible embodiment, the processor is further configured to:

The terminal device is disconnected from the 5G network and accesses the first long-term evolution LTE network by using the first SIM card when the terminal device needs to perform the first voice service, where the first voice service is related to one of the first SIM card and the second SIM card;

the terminal device performs the VoLTE-based first voice service through the first LTE network or the second LTE network corresponding to the one SIM card, and receives the connection request through the second radio frequency receive channel, where the first voice service occupies the first radio frequency receive channel and the radio frequency transmit channel, the connection request is used to request the terminal device to perform the VoLTE-based second voice service, and the second voice service is related to the other of the first SIM card and the second SIM card; and the terminal device responds to the connection request by occupying the second radio frequency transmit channel in the time division manner in a process of performing the first voice service.

In a possible embodiment, as shown in FIG. 14, the terminal device further includes a memory 105. The memory 105 stores one or more programs, and the one or more programs include instructions. When the instructions are executed by the processor 101, the terminal device 10 performs the method performed by the terminal device 10 in any embodiment of this application.

An embodiment of this application further provides a computer-readable storage medium, configured to store instructions. When the instructions are executed by a processor of a terminal device, the terminal device is enabled to implement the communication method performed by the terminal device in the embodiments of this application.

An embodiment of this application further provides a computer program product. The computer program product includes computer program code, and when the computer program code is run on a computer, the computer is enabled to perform the communication method performed by the terminal device in any embodiment of this application.

An embodiment of this application further provides a chip system. The chip system includes a processor, configured to implement a function of the terminal device according to any one of the foregoing aspects, for example, receive or process data and/or information in the method according to any one of the foregoing aspects. In a possible design, the chip system further includes a memory. The memory is configured to store program instructions and/or data. The chip system may include a chip, or may include a chip and another discrete component.

Persons of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It may be clearly understood by persons skilled in the art that, for convenient and brief description, for a detailed working process of the foregoing network device, refer to a corresponding process in the foregoing method embodiments. Details are not described herein again.

It may be understood that the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic, mechanical, or another form.

The foregoing descriptions are merely specific implementations and embodiments of this application, but are not intended to limit the protection scope of this application. Any variation or replacement readily figured out by persons skilled in the art within the technical scope disclosed in this application shall fall within the protection scope of this application.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions provided in the foregoing embodiments or make equivalent replacements to some technical features thereof, without departing from the spirit and scope of the technical solutions of the embodiments of this application.

What is claimed is:

1. A terminal device comprising a processor configured to:
   disconnect the terminal device from a fifth generation (5G) network and connect the terminal device to a first long-term evolution (LTE) network using a first subscriber identification module (SIM) card when the terminal device is to perform a first voice service, wherein the terminal device comprises a radio frequency transmit channel, a first SIM card interface is configured to communicate with the first SIM card, and a second SIM card interface is configured to communicate with a second SIM card, and wherein the terminal device connects to the 5G network using the first SIM card;
   when the first voice service is related to the first SIM card, perform a voice over long-term evolution (VoLTE)-based first voice service through the first LTE network, and receive a first connection request from a second LTE network, wherein the first connection request requests the terminal device to perform a VoLTE-based second voice service, and the second voice service is related to the second SIM card; and respond to the first connection request by occupying the radio frequency transmit channel in a time division manner when performing the first voice service, and wherein the processor is further configured to:

when the terminal device is to perform the first voice service, send secondary cell group (SCG) failure signaling to a second base station in the first LTE network, wherein the SCG failure signaling indicates the second base station is to exchange information with a first base station in the 5G network to cause the first base station to release a radio resource control (RRC) connection between the first base station and the terminal device; and receive an RRC release message from the first base station that indicates the terminal device is to perform, based on an RRC connection between the second base station and the terminal device, a voice service and/or a data service related to the first SIM card.

2. The terminal device according to claim 1, wherein the processor is further configured to:

when the first voice service is related to the second SIM card, perform the first voice service through the second LTE network, and receive a second connection request from the first LTE network, wherein the second connection request requests the terminal device to perform a third voice service related to the first SIM card; and respond to the second connection request by occupying the radio frequency transmit channel in the time division manner in the process of performing the first voice service.

3. The terminal device according to claim 1, wherein the processor is further configured to:

when the terminal device needs to perform the first voice service, send a signal measurement report to a first base station in the 5G network, wherein the signal measurement report indicates that signal quality of the first base station in the 5G network relative to the terminal device does not meet a preset condition;

receive a handover instruction sent by the first base station, wherein the handover instruction comprises access information allocated by the second base station in the first LTE network to the terminal device;

update, using the access information from the handover instruction, access information that is in the terminal device and that is related to the first SIM card; and send a confirmation message to the second base station in the first LTE network.

4. The terminal device according to claim 1, wherein the processor is further configured to:

when the terminal device is to perform the first voice service, disconnect the terminal device from the 5G network by reselecting a public land mobile network (PLMN), and connect the terminal device to the first LTE network using the first SIM card.

5. The terminal device according to claim 1, wherein the processor is further configured to:

before disconnecting the terminal device from the 5G network, measure signal quality of the 5G network; and after disconnecting the terminal device from the 5G network, stop measuring the signal quality of the 5G network.

6. The terminal device according to claim 1, wherein the processor is further configured to:

when an INVITE message used to request the terminal device to perform the first voice service is received, disconnect the terminal device from the 5G network, and connect the terminal device to the first LTE network using the first SIM card.

7. The terminal device according to claim 1, wherein the processor is further configured to: in response to a request operation of a user for the first voice service, disconnect the terminal device from the 5G network, and connect the terminal device to the first LTE network by using the first SIM card.

8. A communication method, comprising:

disconnecting a terminal device from a firth (5G) network and connecting the terminal device to a first long-term evolution (LTE) network using a first subscriber identification module (SIM) card when the terminal device is to perform a first voice service, wherein the terminal device comprises a radio frequency transmit channel, a first SIM card interface configured to communicate with the first SIM card, and a second SIM card interface configured to communicate with a second SIM card, and the terminal device connects to the 5G network using the first SIM card;

when the first voice service is related to the first SIM card, performing a voice over long-term evolution (VoLTE)-based first voice service through the first LTE network, and receiving a first connection request from a second LTE network, wherein the first connection request requests the terminal device to perform a VoLTE-based second voice service, and the second voice service is related to the second SIM card; and responding to the first connection request by occupying the radio frequency transmit channel in a time division manner when performing the first voice service, and wherein the disconnecting the terminal device from the 5G network and connecting the terminal device to the first LTE network using the first SIM card comprises:

sending secondary cell group (SCG) failure signaling to a second base station in the first LTE network, wherein the SCG failure signaling indicates the second base station is to exchange information with a first base station in the 5G network to cause the first base station to release a radio resource control (RRC) connection between the first base station and the terminal device; and receiving an RRC release message from the first base station that indicates the terminal device is to perform, based on an RRC connection between the second base station and the terminal device, a voice service and/or a data service related to the first SIM card.

9. The method according to claim 8, wherein the method further comprises:

when the first voice service is related to the second SIM card, performing the first voice service through the second LTE network, and receiving a second connection request from the first LTE network, wherein the second connection request requests the terminal device to perform a third voice service related to the first SIM card; and responding to the second connection request by occupying the radio frequency transmit channel in the time division manner in the process of performing the first voice service.

10. The method according to claim 8, wherein the disconnecting the terminal device from the 5G network and connecting the terminal device to the first LTE network using the first SIM card comprises:

sending a signal measurement report to a first base station in the 5G network, wherein the signal measurement report indicates that signal quality of the first base station in the 5G network relative to the terminal device does not meet a preset condition;

receiving a handover instruction sent by the first base station, wherein the handover instruction comprises access information allocated by the second base station in the first LTE network to the terminal device;

updating, using the access information from the handover instruction, access information that is in the terminal device and that is related to the first SIM card; and sending a confirmation message to the second base station in the first LTE network.

11. The method according to claim 8, wherein the disconnecting the terminal device from the 5G network and connecting the terminal device to the first LTE network using the first SIM card comprises:

disconnecting the terminal device from the 5G network by reselecting a public land mobile network PLMN, and connecting the terminal device to the first LTE network using the first SIM card.

12. The method according to claim 8, wherein before the disconnecting the terminal device from the 5G network, the method further comprises:

measuring signal quality of the 5G network; and after the disconnecting the terminal device from the 5G network, the method further comprises: stopping measuring the signal quality of the 5G network.

13. The method according to claim 8, wherein the disconnecting the terminal device from the 5G network and connecting the terminal device to the first LTE network using the first SIM card when the terminal device is to perform the first voice service comprises:

when the terminal device receives an INVITE message used to request the terminal device to perform the first voice service, disconnecting the terminal device from the 5G network, and connecting the terminal device to the first LTE network using the first SIM card.

14. The method according to claim 8, wherein the disconnecting the terminal device from the 5G network and connecting the terminal device to the first LTE network using the first SIM card when the terminal device is to perform the first voice service comprises:

in response to a request operation of a user for the first voice service, disconnecting the terminal device from the 5G network, and connecting the terminal device to the first LTE network by using the first SIM card.

15. A non-transitory computer readable storage medium, having instructions stored thereon, which when executed by a processing system of a terminal device, cause the terminal device to perform a method, comprising:

disconnecting a terminal device from a firth (5G) network and connecting the terminal device to a first long-term evolution (LTE) network using a first subscriber identification module (SIM) card when the terminal device is to perform a first voice service, wherein the terminal device comprises a radio frequency transmit channel, a first SIM card interface configured to communicate with the first SIM card, and a second SIM card interface configured to communicate with a second SIM card, and the terminal device connects to the 5G network using the first SIM card;

when the first voice service is related to the first SIM card, performing a voice over long-term evolution (VoLTE)-based first voice service through the first LTE network, and receiving a first connection request from a second LTE network, wherein the first connection request requests the terminal device to perform a VoLTE-based second voice service, and the second voice service is related to the second SIM card; and responding to the first connection request by occupying the radio frequency transmit channel in a time division manner when performing the first voice service, and wherein the disconnecting the terminal device from the 5G network and connecting the terminal device to the first LTE network using the first SIM card comprises:

sending secondary cell group (SCG) failure signaling to a second base station in the first LTE network, wherein the SCG failure signaling indicates the second base station is to exchange information with a first base station in the 5G network to cause the first base station to release a radio resource control (RRC) connection between the first base station and the terminal device; and receiving an RRC release message from the first base station that indicates the terminal device is to perform, based on an RRC connection between the second base station and the terminal device, a voice service and/or a data service related to the first SIM card.

16. The non-transitory computer readable storage medium according to claim 15, wherein the method further comprises:

when the first voice service is related to the second SIM card, performing the first voice service through the second LTE network, and receiving a second connection request from the first LTE network, wherein the second connection request requests the terminal device to perform a third voice service related to the first SIM card; and responding to the second connection request by occupying the radio frequency transmit channel in the time division manner in the process of performing the first voice service.

17. The non-transitory computer readable storage medium according to claim 15, wherein the disconnecting the terminal device from the 5G network and connecting the terminal device to the first LTE network using the first SIM card comprises:

sending a signal measurement report to a first base station in the 5G network, wherein the signal measurement report indicates that signal quality of the first base station in the 5G network relative to the terminal device does not meet a preset condition;

receiving a handover instruction sent by the first base station, wherein the handover instruction comprises access information allocated by the second base station in the first LTE network to the terminal device;

updating, using the access information from the handover instruction, access information that is in the terminal device and that is related to the first SIM card; and sending a confirmation message to the second base station in the first LTE network.

18. The non-transitory computer readable storage medium according to claim 15, wherein the disconnecting the terminal device from the 5G network and connecting the terminal device to the first LTE network using the first SIM card comprises:

disconnecting the terminal device from the 5G network by reselecting a public land mobile network PLMN, and connecting the terminal device to the first LTE network using the first SIM card.

19. The non-transitory computer readable storage medium according to claim 15, wherein before the disconnecting the terminal device from the 5G network, the method further comprises:

measuring signal quality of the 5G network; and after the disconnecting the terminal device from the 5G network, the method further comprises: stopping measuring the signal quality of the 5G network.

20. The non-transitory computer readable storage medium according to claim 15, wherein the disconnecting the terminal device from the 5G network and connecting the terminal device to the first LTE network using the first SIM card when the terminal device is to perform the first voice service comprises:

when the terminal device receives an INVITE message used to request the terminal device to perform the first voice service, disconnecting the terminal device from the 5G network, and connecting the terminal device to the first LTE network using the first SIM card.

* * * * *